(12) United States Patent
Petersen et al.

(10) Patent No.: US 6,593,940 B1
(45) Date of Patent: Jul. 15, 2003

(54) METHOD FOR FINDING ERRORS IN MULTITHREADED APPLICATIONS

(75) Inventors: Paul M. Petersen, Champaign, IL (US); Flint Pellett, Urbana, IL (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/229,477

(22) Filed: Jan. 13, 1999

Related U.S. Application Data

(63) Continuation-in-part of application No. 09/220,735, filed on Dec. 23, 1998.

(51) Int. Cl.[7] .............................. G06F 11/00; G09G 5/00
(52) U.S. Cl. ........................................ 345/700; 714/38
(58) Field of Search ................................ 345/326, 346, 345/967, 700, 804, 853, 764, 866, 762–763; 717/4; 714/38, 799; 709/104, 107

(56) References Cited

U.S. PATENT DOCUMENTS

| | | | | |
|---|---|---|---|---|
| 5,590,056 A | * | 12/1996 | Barritz | 702/186 |
| 5,632,032 A | * | 5/1997 | Ault et al. | 709/100 |
| 5,822,588 A | * | 10/1998 | Sterling et al. | 717/4 |
| 5,872,909 A | * | 2/1999 | Wilner et al. | 714/38 |
| 5,889,988 A | * | 3/1999 | Held | 709/103 |
| 5,918,004 A | * | 6/1999 | Anderson et al. | 714/25 |
| 5,960,199 A | * | 9/1999 | Brodsky et al. | 717/4 |
| RE36,422 E | * | 11/1999 | Pazel | 707/104 |
| 6,009,269 A | * | 12/1999 | Burrows et al. | 717/4 |
| 6,199,199 B1 | * | 3/2001 | Johnston et al. | 717/4 |
| 6,230,313 B1 | * | 5/2001 | Callahan, II et al. | 709/106 |
| 6,282,701 B1 | * | 8/2001 | Wygodny et al. | 702/183 |
| 6,434,714 B1 | * | 8/2002 | Lewis et al. | 714/38 |

\* cited by examiner

*Primary Examiner*—Sy D. Luu
(74) *Attorney, Agent, or Firm*—Blakely, Sokoloff, Taylor & Zafman LLP

(57) ABSTRACT

A software implemented mechanism detects defects in multithreaded programs. Defects are classified into two categories, races and deadlocks. The races are instanced during the execution of the program where multiple threads may modify and access a shared variable without being synchronized. The synchronization might be due to direct or inferred mutual exclusion due to transitive synchronization derived from a signaling event, or derived from prior direct mutual exclusion. Deadlocks are detected by server tasks which monitor a representation of thread state and detect cycles in these graphs. A degenerate form of deadlock is detected where a thread can not make forward progress for a defined period of time due to the unavailability of a resource or the lack of a signaling event. The mechanism includes an annotated address trace generator, an analysis mechanism for detecting defects in the annotated trace, a report generator for communicating the defects to the user.

16 Claims, 22 Drawing Sheets

FIG. 16

Show Search  Warning Location: DiningOnePhilosopher.java  Show Stack

```
236
237    public void run() {
238        while (true) {
239
240
241            think();
242
243            synchronized (rightFork) {
244
245                // Got a lock on the right fork; pick it up.
246                rightArmStatus = ARM_REACHING_FOR_FORK;
247                DiningPhilosophers.dp.redraw();
248                thinkBetweenForks();
249
250                synchronized (leftFork) {
251
252                    // Got locks on both forks; pick up the left
253                    leftArmStatus = ARM_REACHING_FOR_FORK;
254                    DiningPhilosophers.dp.redraw();
255
256                    // Eat for a bit
257                    for (int i = 0; i < 10; i++) {
258
259                        pauseBetweenBites();
260                        rightFork.onTable = false;
261                        leftFork.onTable = false;
262                        leftArmStatus = ARM_EATING1;
263                        rightArmStatus = ARM_EATING2;
264                        DiningPhilosophers.dp.redraw();
```

Set Error Hiding Preferences

1902

- Hide messages based on priority
  - ☑ Hide lower priority messages
- Hide messages based on their type
  - ☐ Hide (most) Information messages
  - ☐ Hide all Caution messages
  - ☐ Hide all Warning messages
  - ☐ Hide all Error messages
- Hide messages that match an Active rule below. Click once to select line, again to edit

[ Add Line ]  [ Delete Line ]

| Active | Object | Function | Parameter String | Continued |
|---|---|---|---|---|
| ☑ | Source class.method | Starts with | java. | ☐ |
| ☑ | Source class.method | Starts with | javax. | ☐ |
| ☐ | Source class.method | Starts with | sun. | ☐ |
| ☐ | Source class.method | Starts with | sunw. | ☐ |
| ☑ | Sink class.method | Ends with | <init>() | ☐ |
| ☑ | Source File Name | does not start with | /usr/homes/myname/myprogram | ☐ |
| ☑ | Verbose Message Text | contains | incrementSynchronized() | ☑ |
|  | Source Line Number | is greater than | 110 | ☑ |
|  | Source Line Number | is less than | 300 | ☐ |
| ☑ | Verbose Message Text | is | #82 in CounterPanel.incrementSynchron... | ☐ |
| ☑ | Terse Message Text | does not contain | writes to a variable | |

- If Continued is checked, "AND" that line with the following one to form a combination rule.
- If the Parameter String field is blank, this rule is ignored and won't be saved.
- Always TAB or click to a different cell to store edits before Applying changes.

[ Apply Changes ]  [ Cancel Changes ]  [ Close Window ]

FIG. 19

METHOD FOR FINDING ERRORS IN MULTITHREADED APPLICATIONS

CROSS REFERENCE TO RELATED APPLICATION

The present application is a continuation-in-part of U.S. patent application Ser. No. 09/220,735, filed Dec. 23, 1998, entitled Method for Finding Errors in Multithreaded Applications.

BACKGROUND OF THE INVENTION

The POSIX Standard 1003.1c defines a portable interface to threading packages for multiple operating systems. This standard, known as pthreads, is the most widely adopted binding of the threading control functions to a programming language. The adoption of pthreads by the C and C++ programming community provides a common binding for multithreaded applications to be created. Other languages, like Java, have not adopted the pthread binding for the thread control functions, but do provide a semantically similar set of control primitives. Other operating systems also diverge in the exact implementation of the threading control primitives. Microsoft, Inc., with it's WIN32 programming API, implements Windows Threads, which are similar but not exactly like the definitions of the threads in other languages or on other platforms.

Even given the diversity of threading implementations, we can see a common semantic model coming into definition. A thread is defined to be an autonomous unit of execution control sharing a common address space with the host process. The threads are allowed to run using a portion of the CPU or CPUs on which they are executing. The exact details of the thread scheduling mechanism are usually not known in a portable manner. The users of the threading packages usually just accepts that eventually the threads will execute to completion.

In addition to the control mechanisms for creating and destroying threads, most threading implementations supply synchronization mechanisms. These mechanisms are used to communicate between the threads. The communication may be in the form of mutual exclusions (i.e. only one thread is allowed to execute a section of code), or may be in the form of signaling (i.e. one thread notifies other threads that some information is now available).

The combination of threading control and synchronization mechanisms produce a semantic environment that is sufficient to control the multithreaded algorithms but also sufficient to introduce severe programming problems when used incorrectly.

Several classes of problems arise when threads are used incorrectly. This document will focus on two main classes, these are races, and deadlock. A race is defined as simultaneous access to a shared resource or location in a manner when mutual exclusion is not defined. A deadlock is defined to be a condition in the program where a set of threads waits indefinitely to acquire a set of resources.

Two research projects are notable as prior art. These are Eraser and RecPlay. The purpose of both systems is to detect errors in threaded applications.

Eraser was developed at the University of Washington. It is based on the ATOM technology developed by Digital Equipment Corporation (DEC) for the instrumentation of ALPHA microprocessor executables. Eraser's mode of operation is to translate an executable program into an instrumented executable program. The new program is then executed and the errors are calculated during the execution. After the execution a report is generated indicating where the program could execute incorrectly.

Eraser is based on the notion of lock coverage sets. For each memory reference in the program, Eraser records the set of locks that are held during the access. It then calculates the intersection of all of these sets over all accesses to each memory location. If the memory location is accessed by more than one thread, and the set of locks held during each access is empty, then Eraser records that a potential error exists in the program for accesses to this memory location.

The design of Eraser has several consequences. First, the algorithm used by Eraser is timing independent. The order of the memory accesses has no effect on the results of the error detection. Second, Eraser has problems with derived effects. For example, in the Bounded Buffer algorithm, locks are held when there are accesses to the buffer to get or to put an element, but no locks need to be held when accessing the fields of the element that was retrieved from the buffer. Eraser (without additional hints) incorrectly flags these accesses as potential errors. Eraser is also unable to deal with directed synchronization caused by the use of a condition variable, or a thread join operation. And finally, Eraser can not deal with the concept of a global or a local barrier, where the mode of operation in the program changes. For example, if in the first phase a variable is protected by the lock "A", and in the second phase the variable is protected by the lock "B", Eraser would report that the set of locks held during the accesses to the variable is empty. Eraser has the advantage that only a single execution of the program is needed to find the errors that might have occurred during that execution.

The RecPlay system was developed in the Universiteit Gent, Belgium. RecPlay is based on the notion that it is possible to record the order in which synchronization events occur during an execution of a program, and then to replay that execution by delaying the execution of the synchronization events until they occur in the same order as was recorded for the original execution. The advantage to this scheme is that recording the order of the synchronization events is an inexpensive operation and thus causes minimal perturbation to the execution of the program. The assumption is that this recording would be permanently enabled so that if an error exhibited itself it would be easy to replay the execution to determine the cause of the error. During the replay, the program is executed again in the same environment and with the same inputs as the original execution. This error detection phase instruments the executable code on the fly to replace SPARC memory references with a trap instruction so that the thread memory trace can be determined. RecPlay is based on the notion of Lamport clocks. The clocks maintain a partial ordering of the threads. When a memory access is being checked, the previous access to this memory location is compared with the current access to see if a partial ordering exists between the two threads. If a partial ordering does not exist (based on the Lamport clocks), then a potential error is reported as the accesses to this memory location are not synchronized with respect to each other.

The design of RecPlay has several consequences. First, the algorithm used by RecPlay is timing dependent. Since RecPlay uses the order of events to determine correctness, changing the order of events can change the output of the analysis. RecPlay attempts to overcome this problem by determining the order of events with minimal intrusiveness during the first recording phase where only the synchronization events are monitored. Second, RecPlay can correctly determine indirect synchronization effects. It can correctly determine that the Bounded Buffer algorithm protects the accesses to each element which is placed into the buffer. It also can correctly handle multiple phases of execution where the locks are different for the phases. The greatest weakness of RecPlay is the requirement for replayed execution. For some programs, it is trivial to restart an execution and to exactly reproduce the environment and the inputs which caused the program to generate the sequence of synchronization events that were recorded. But this is not always possible. If the program makes destructive modifications to its environment it may be very difficult to roll-back these changes to allow repeated executions to be exactly identical. Another weakness of the RecPlay system is that it requires three executions of the program to report the error messages. The first execution records the synchronization order. The second execution calculates potentially unsynchronized memory accesses, and the third execution generates the report of which threads accesses the problem memory locations in an unsynchronized manner.

SUMMARY

By way of introduction only, the present invention provides a mechanism for detecting defects in multithreaded computer programs. Defects are classified into two categories, races and deadlocks. Races occur during execution of the program where multiple threads may modify and access a shared variable without synchronization. Deadlocks are detected by server tasks which monitor a representation of thread state and detect cycles in these graphs. A further form of deadlock is detected where a thread can not make forward progress for a predetermined period of time.

The mechanism is preferably implemented in software code for operation in conjunction with a general purpose computer. Particular applications for the mechanism include debugging programs written in Java and pthreads. The mechanism includes an annotated address trace generator, an analysis mechanism for detecting defects in the annotated trace and a report generator for communicating the defects to the user. In one embodiment, the report generator provides a graphical user interface for interactive identification and correction of detected defects.

The foregoing description of the present invention has been provided only by way of introduction. Nothing in this section should be taken as a limitation on the following claims, which define the scope of the invention.

BRIEF DESCRIPTION OF THE DRAWINGS

FIG. 13 through FIG. 22 illustrate screen displays of the graphical user interface.

DETAILED DESCRIPTION OF THE PRESENTLY PREFERRED EMBODIMENTS

Figure 1:
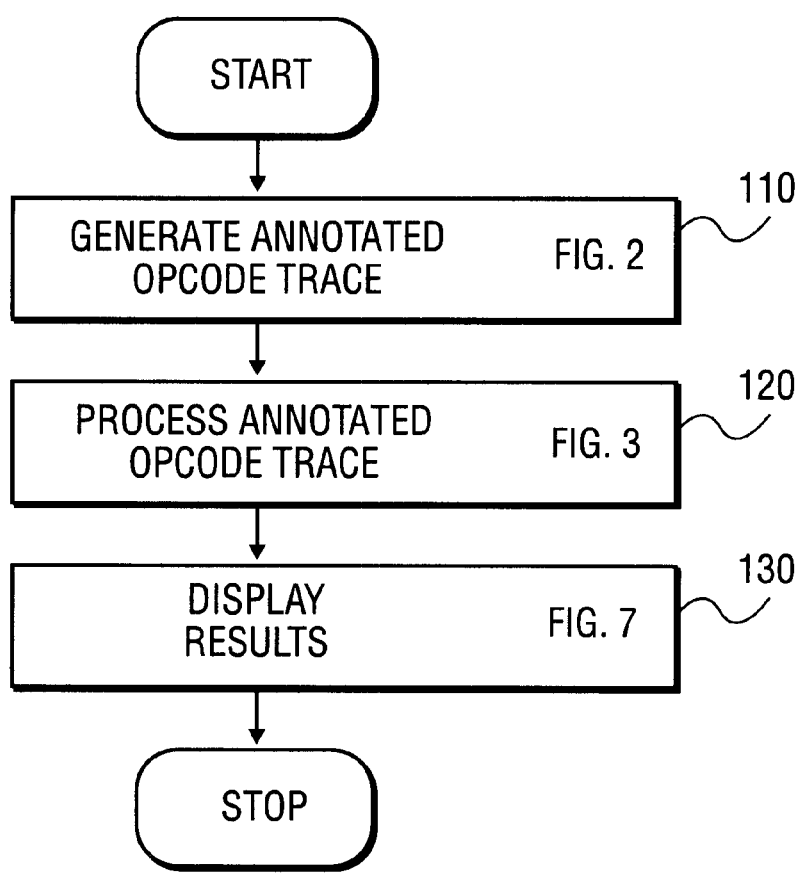
FIG. 1 through FIG. 6 are flow diagrams illustrating operation of a method for finding errors in multithreaded applications.

The present invention is a system for detecting the presence of threading defects in a multithreaded program. A defect is defined as the potential presence of a race or deadlock. The method of defect detection is to execute the program in a manner which generates an annotated memory address trace, and then to analyze that trace to detect the defects. This is a dynamic analysis system, not a static analysis system. By relying on dynamic analysis the system does not need to make conservative assumptions as to the behavior of the program being analyzed since the act of executing the program generates the exact behavior of the program.

The system is composed of multiple parts. These parts are (1) a means for generating an annotated memory address trace, (2) a simulator which analyses the address trace to detect defects, and (3) a means for displaying the results to the user.

Part 1 can be implemented in multiple ways. It can be implemented as a source-code to source-code translator where extra annotations are inserted into the executable program which mirror the activity of the original program. It can be implemented as a binary rewriting transformation where the machine instructions are modified to generate the annotated address trace in addition to the original purpose of the program. Or, it may be implemented via a virtual machine with the instrumentation to generate the annotated address trace placed into the interpreter for the virtual machine. In this last implementation, the executable program is run unchanged, it is the virtual machine which executes the program that is changed.

Part 2 takes the annotated address stream generated by part 1, and analyzes this stream to produce the information that is reported by part 3. The rules that are applied in this process are as follows:

1. A data race occurs when two threads access the same memory location at the same time (where at least one of the accesses is a write).

2. Two threads can not hold the same lock at the same time.

3. When two threads access the same lock, one of them must be granted access first. This establishes a partial order between the two threads at that point in the program.

4. For each memory location we record the last access in terms of who, where, and when.

who is which thread accessed the location where is the program counter at the time of the access when is a notion of the time of the access 1. When a subsequent access occurs, the partial ordering of the threads is checked to see if the last access and the current access are totally ordered at this point. If the accesses are not totally ordered (via a synchronization event), then an error is reported.

2. A synchronization race can also occur. If a signaling event is received by an object for which no corresponding thread is waiting to be signaled, then we have a race condition on the synchronization object rather than data race.

This description of race defects is contingent upon maintaining three different kinds of information which the annotated memory address trace is being analyzed.

The first is who, this is also the easiest since we can assign a unique identifier to each thread that is created and use this information to track the threads.

The second kind of information is where, this information is slightly more difficult, it is easy to record the program counter at the time of the trace event, but this is not very meaningful to the user. It is much better to record information which can be mapped back to the user's source code. One way is to be told the source code location periodically whenever the source location changes. Another way is to record the program counter along with a mapping mechanism to translate the program counter back into the source code location from which it came.

The final kind of information is when. The time an event occurs is a very important concept and its definition is at the heart of the present method. We want a definition such that it is efficient to determine if an event which occurred on a thread is ordered with respect to an event which occurred on a different thread. To accomplish this we will define time to be an integral value which is monotonically increasing. Each thread maintain its own value for the time. When two threads interact, each thread updates its local time value to be consistent with the time value of the other thread.

The analysis also is concerned with deadlock. Three different kinds of deadlock are detected.

1. Stalls: A stall is a condition where a thread waits to be signaled for a long period of time. Under a user controlled threshold, if a thread waits to be signaled longer than that a predetermined threshold time period, a message is generated telling the user that a problem may have occurred in this thread.

2. Monitor Lock Cycles: A potential deadlock condition exists if the order in which locks are acquired is not consistent across all of the threads. Given any set of locks that are owned by a thread at a given time, that thread acquired the locks in a specific sequence. If another thread acquires the same set of locks but not in the same sequence, then it is possible for the two threads to deadlock on a future run by interleaving the lock acquisition sequences. This condition is reported to the user via a message listing the locks and the sequence in which the locks were acquired.

3. Deadlock: An actual deadlock occurs when a set of threads each owns a lock that another member of that set of threads is trying to acquire. Since no thread can release the locks that it owns until it has acquired the new resource, no thread will ever be able to acquire the new resource.

Each type of deadlock defect requires a different method for its detection. Stalls are detected by a server thread which periodically checks the amount of time that each thread has spent waiting to acquire a lock or waiting to be signaled by another thread. If this time exceeds a predetermined threshold, which may be settable by a user, then a message is generated which indicates that a stall occurred. The message contains information about which thread stalled, and the state of the thread when the stall occurred.

A monitor lock cycle is detected by looking for cycles in a resource acquisition graph. As each thread acquires a lock, a link is placed into the lock acquisition graph. The link connects the most recently acquired lock that the thread currently holds with the lock that the thread is currently trying to acquire. If the act of placing the link into the graph causes the graph to be cyclic, then a message is generated which describes the cycle of locks and the thread's state when the cycle was first created.

Many algorithms are available to determine if a cycle exists in a graph. The simplest, a greedy, limited depth first search is sufficient to catch these defects. Others may be used as well.

Deadlocks are a permanent condition of the program once they occur. A server thread periodically checks the graph connecting the threads which are waiting to acquire a lock, to the threads which currently hold the lock. If a cycle is detected in this graph, then a deadlock message is reported to the user listing the state of all threads contained in the acquisition cycle.

The monitor lock cycle graph is different from the deadlock cycle graph. The monitor lock cycle graph is a persistent record connecting locks that are held to locks that are trying to be acquired. It may not represent a feasible state that the program could encounter. The deadlock cycle graph is a correct representation of the locks which are currently owned by a thread and the locks that the threads are currently trying to acquire.

Part 3 combines information generated during part 1 (if any was generated), with information generated during part 2, to produce a report to the user of the places and kinds of defects detected during this execution of the program.

The illustrated embodiment defines a necessary condition for a defect to occur, but does not cover all possible conditions. Thus, this embodiment can detect the presence of a defect, but can not prove the absence of all such defects.

In one embodiment, a method in accordance with the present invention is arranged as computer executable software code. The code includes several modules or routines which cooperate to achieve the desired goal of detecting defects in multithreaded programs. Input to the code is a user's source code, which is a multithreaded program or application for analysis. The source code may have multithreading defects such as data races or deadlocks. Output from the code may be an error list or a corrected source code listing in which the defects have resolved. In one preferred embodiment, the code includes a graphical user interface which allows interactive viewing of the errors and other defects detected by the code as well interactive resolution of those errors. In this embodiment, the method permits quick and efficient resolution of defects in multithreaded applications, a result which has previously not been attainable.

Referring now to FIG. 1, it shows a flow diagram illustrating a method for finding errors in multithreaded applications. In the present embodiment, the method includes three steps. At step 110, an annotated opcode trace is generated. This step is illustrated in further detail in FIG. 2. At step 120, the annotated opcode trace is processed. Step 120 is illustrated in greater detail in FIG. 4 through FIG. 6. At step 130, the results of the processing step 120 are displayed. This is illustrated in greater detail in connection with FIG. 7.

Figure 2:
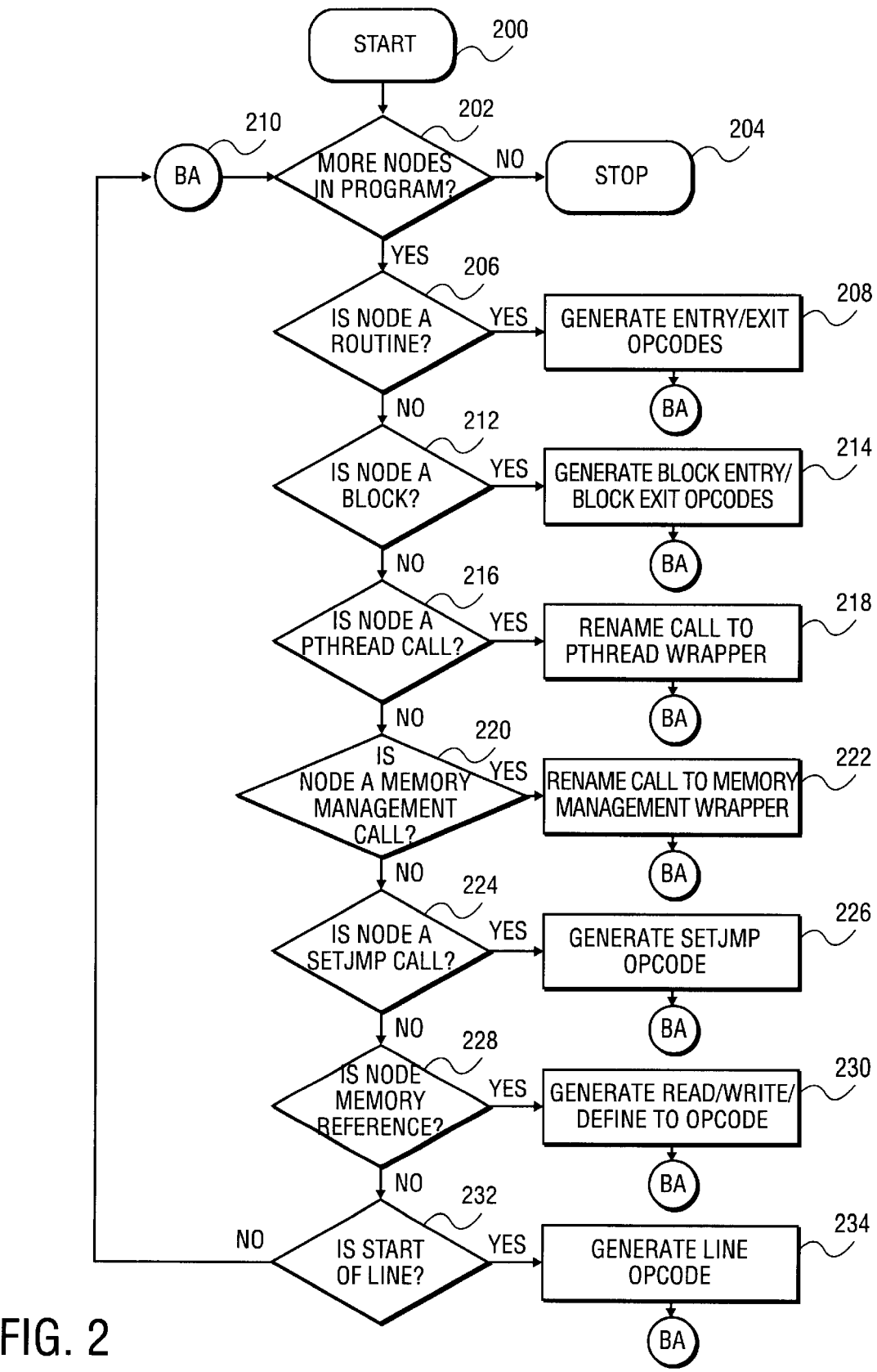

FIG. 2 is a flow diagram illustrating in detail method steps which may be implemented for generating an annotated memory address trace. The method begins at step 200. At step 202, the method determines if more nodes exists in the program being analyzed for errors. If not, execution ends at step 204. If there are more nodes in the program, execution proceeds to step 206, where it is determined if the current node is a routine. If so, at step 208, entry/exit opcodes are generated. Control then proceeds to step 210 and from there to step 202 to determine if there are more nodes in the program.

If, at step 206, the node was not a routine, then at step 212, it is determined if the node is a block. If so, at step 214 the method generates block entry/block exit opcodes. Control then proceeds to step 210. If, at step 212, the node was not a block, at step 216, the method determines if the node is a pthread call. If so, at step 218 the call is renamed to a pthread wrapper. Control then proceeds to step 210. If the node is not a pthread call, at step 220 it is determined if the node is a memory management call. If so, at step 222 the call is renamed to a memory management wrapper and execution proceeds to step 210.

If, at step 220, the node was not a memory management call, at step 224 it is determined if the node is a setjmp call.

If so, at step 226 the method generates a setjmp opcode and control proceeds to step 210. If, at step 224, the node was not a setjmp call, at step 228, it is determined if the node is a memory reference. If so, at step 230 the method generates a read/write/define opcode. Control then returns to step 210. If the node was not a memory reference at step 228, at step 232 it is determined if the node is the start of a line. If not, control returns to step 210. If the node is the start of a line, at step 234 the method generates a line opcode and control returns to step 210 for processing the next node, if any, in the program.

As noted above, generating an annotated opcode trace can be implemented in several ways. It can be implemented as a source code to source code translator where extra annotations are inserted into the executable program to mirror the activity of the original program. Further, the method can be implemented as a binary rewriting transformation. Here, the machine instructions are modified to generate the annotated address trace in addition to the original purpose of the program. Still further, the method may be implemented via a virtual machine with the instrumentation to generate the annotated address trace placed into the interpreter for the virtual machine.

Figure 3:
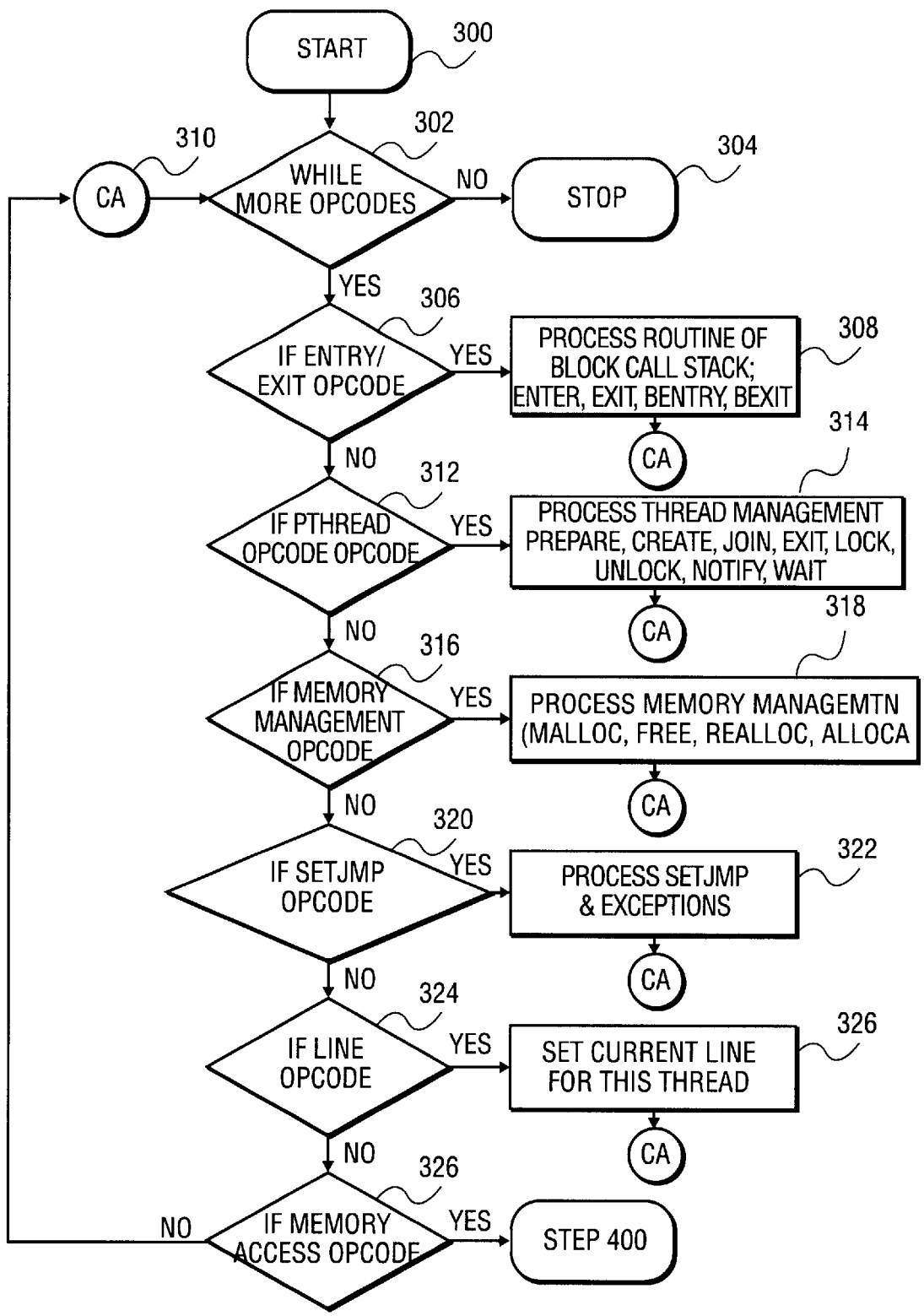

FIG. 3 is a flow diagram illustrating a method for processing the annotated opcode trace generated by the method steps of FIG. 2. The method steps illustrated in FIG. 3, FIG. 4, FIG. 5 and FIG. 6 in combination form one embodiment of method step 120. The method illustrated in FIG. 3 begins at step 300.

At step 302 the method of FIG. 3 determines if more opcodes remain for processing. If not, the method terminates at step 304. If more opcodes remain, at step 306 the method determines if the opcode is an entry/exit opcode. If so, at step 308 the method processes the routine of the block call stack. Parameters used include "enter," "exit," "benter," and "bexit." Control then returns to step 310 to determine, at step 302, if more opcodes remain for processing.

If the current opcode was not an entry/exit opcode at step 306, at step 312 it is determined if the opcode is a pthread opcode. If so, at step 314, the method proceeds to process thread management. Parameters used include those listed in FIG. 3. If the opcode was not a pthread opcode, at step 316 it is determined if the present opcode is a memory management opcode. If so, at step 318 the method proceeds to process memory management, using the parameters listed in FIG. 3.

If the present opcode was not a memory management opcode in step 316, at step 320 it is determined if the present opcode is a setjmp opcode. If so, at step 322 this opcode and related exceptions are processed. If not, at step 324 it is determined if the present opcode is a line opcode. If so, at step 326 the current line for this thread is set using the line opcode. If, at step 324 the opcode was not a line opcode, at step 326 it is determined if the present opcode is a memory access opcode. If not, control returns to step 310 to detect further opcodes.

Figure 4:
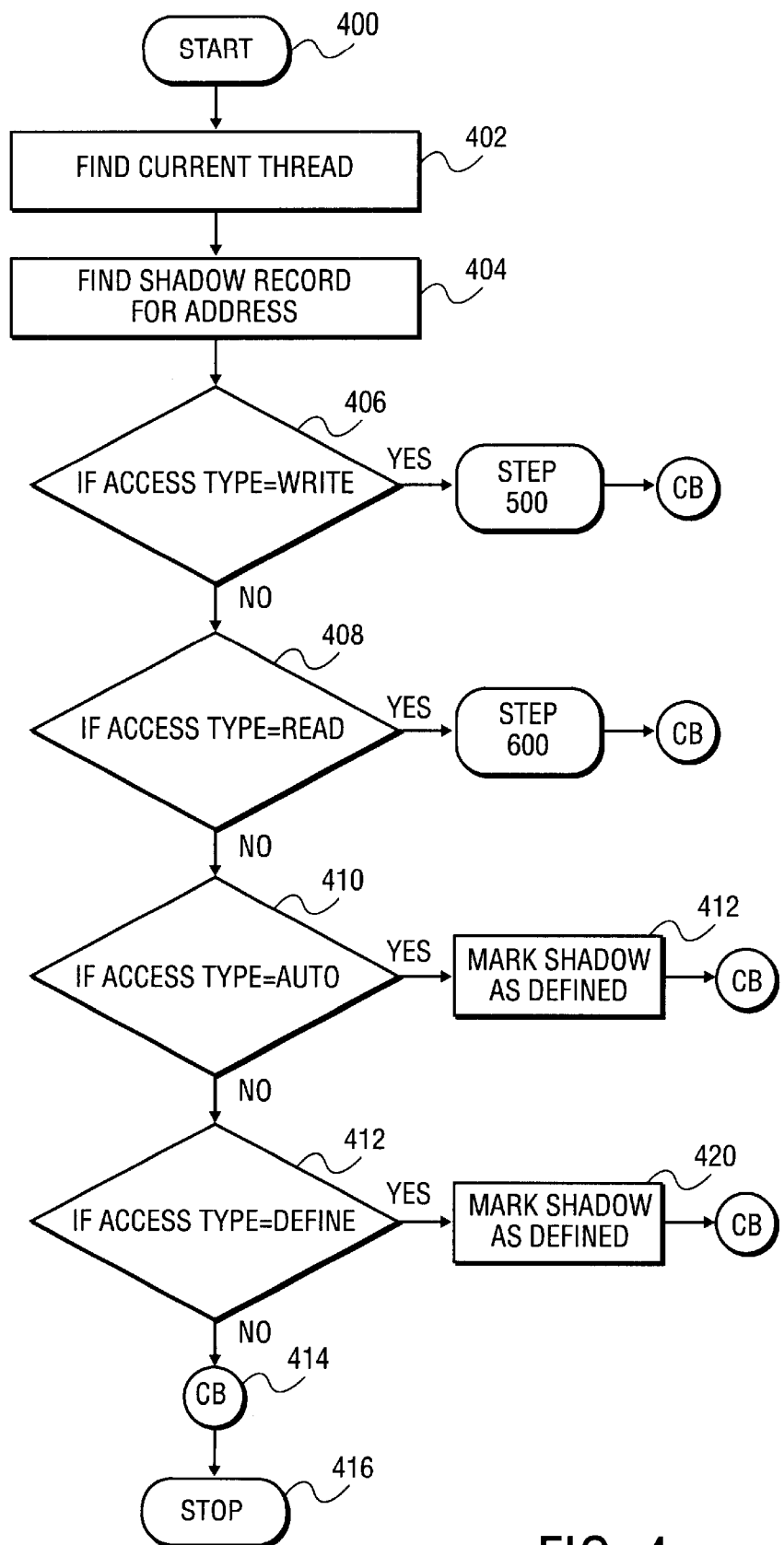

If the present opcode is a memory access opcode, control proceeds to FIG. 4, step 400. FIG. 4 illustrates a method for processing memory accesses. At step 402, the method finds the current thread. For example, this may be a parameter which is passed to a computer subroutine which performs these steps of FIG. 4. At step 404, the method finds the shadow record for the address of the current thread. The shadow record is related addressing information for the currently accessed memory address maintained by the program which implements the method. At step 406, it is determined if the memory access type is a write. If so, control proceeds to step 500, FIG. 5. Method steps for processing a memory access of type write will be discussed below in conjunction with FIG. 5. After implementing the steps associated with step 500, control returns to step 414 and the method terminates at step 416.

If the access type was not of type write, at step 408 it is determined if the memory access type is a read. If so, control proceeds to step 600, FIG. 6. Method steps associated with step 600 and illustrated in FIG. 6 will be described below in conjunction with FIG. 6. Following completion of the method steps associated with step 600, control returns to step 414 (FIG. 4) and the method terminates at step 416.

At step 410, it is determined if the memory access is type auto. If so, at step 418, the shadow record associated with the currently accessed address is marked as undefined. Control then proceeds to step 414 and the method terminates at step 416. At step 412, it is determined if the current memory access is of type define. If so, at step 420 the shadow record for the present memory access is marked as defined. Control then proceeds to step 414 and the method terminates at step 416.

Figure 5:
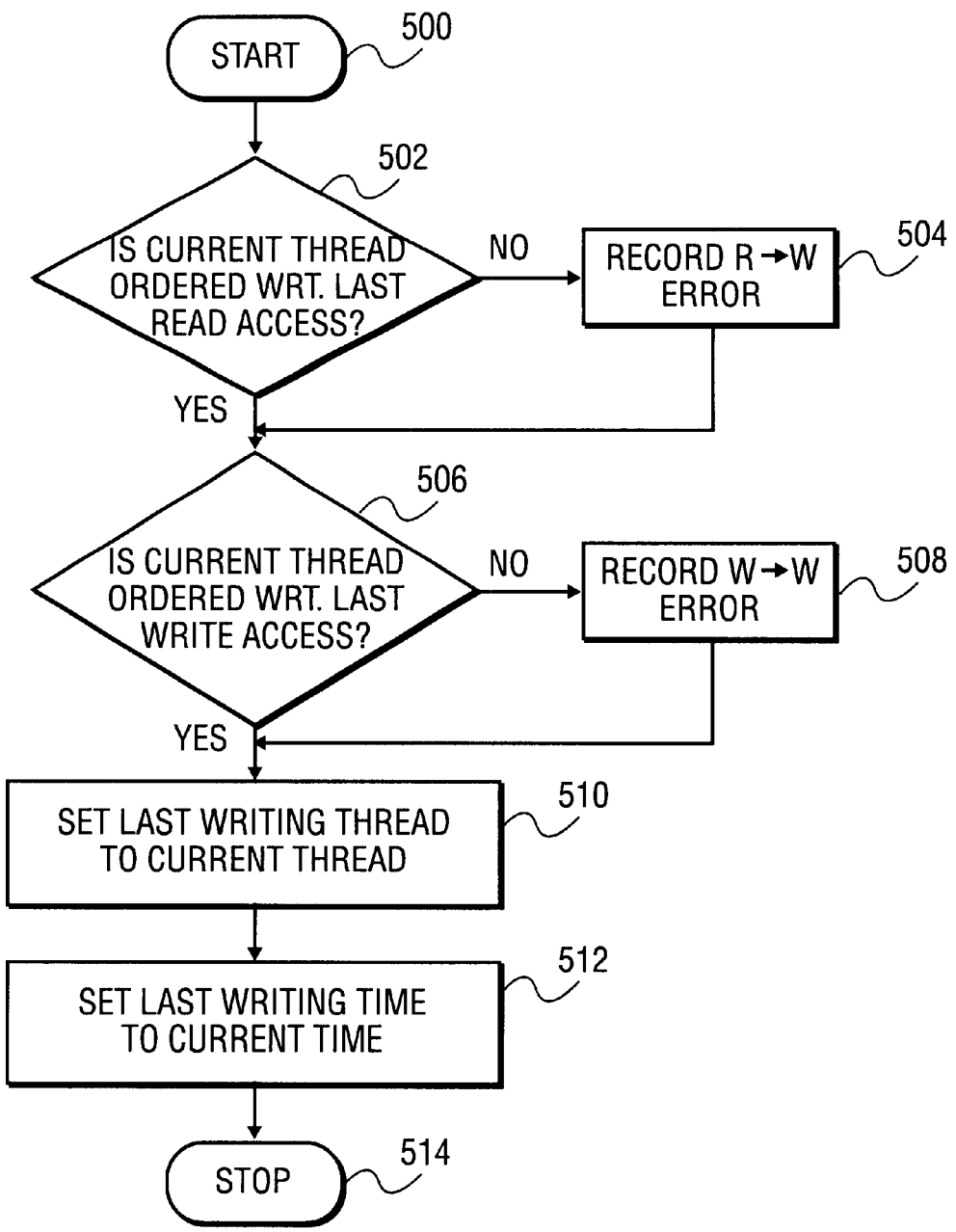

FIG. 5 illustrates a method for checking write accesses to memory. The method begins at step 500. When two threads of a multithreaded application access the lock, one of the threads must be granted access to the lock. This establishes a partial order between the two sets at that point in the program. For each accessed memory location, the program records the last access in terms of which thread accessed the location, where is the program counter at the time of the access, and when the access occurred. When a subsequent access occurs, the partial ordering of the threads is checked to see if the last access and the current access are totally ordered at this point. If the accesses are not totally ordered, for example via a synchronization event, then an error is reported.

At step 502, the method determines if the current thread is ordered with respect to the last read access. If not, at step 504 a read/write error is recorded. At step 506, the method determines if the current thread is ordered with respect to the last write access. If not, a write/write error is recorded at step 508. At step 510 and step 512, records are updated by setting the last writing thread to the current thread and setting the last writing time to the current time. The method of FIG. 5 terminates at step 514.

Figure 6:
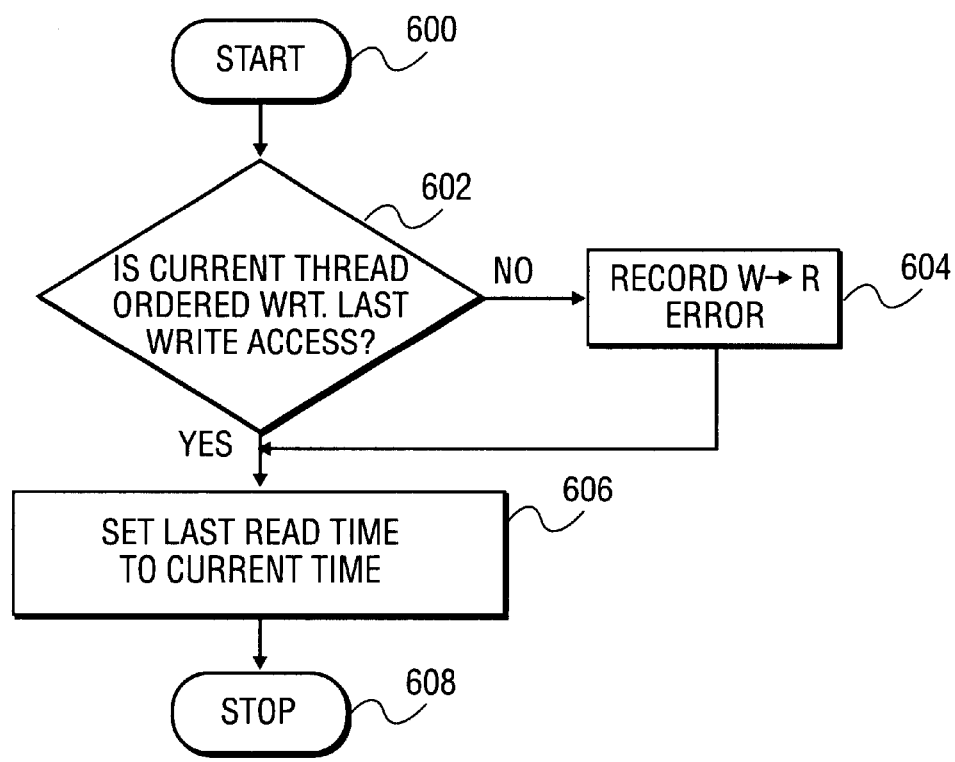

FIG. 6 further illustrates a method for processing memory accesses in multi-threaded application. In FIG. 6, a read access is checked for conflicts. The method of FIG. 6 begins at step 600. At step 602, it is determined if the current thread is ordered with respect to the last write access. If not, at step 604 the method records a write/read error. At step 606, records are updated by setting the last read time to the current time. The method terminates at step 608.

Figure 7:
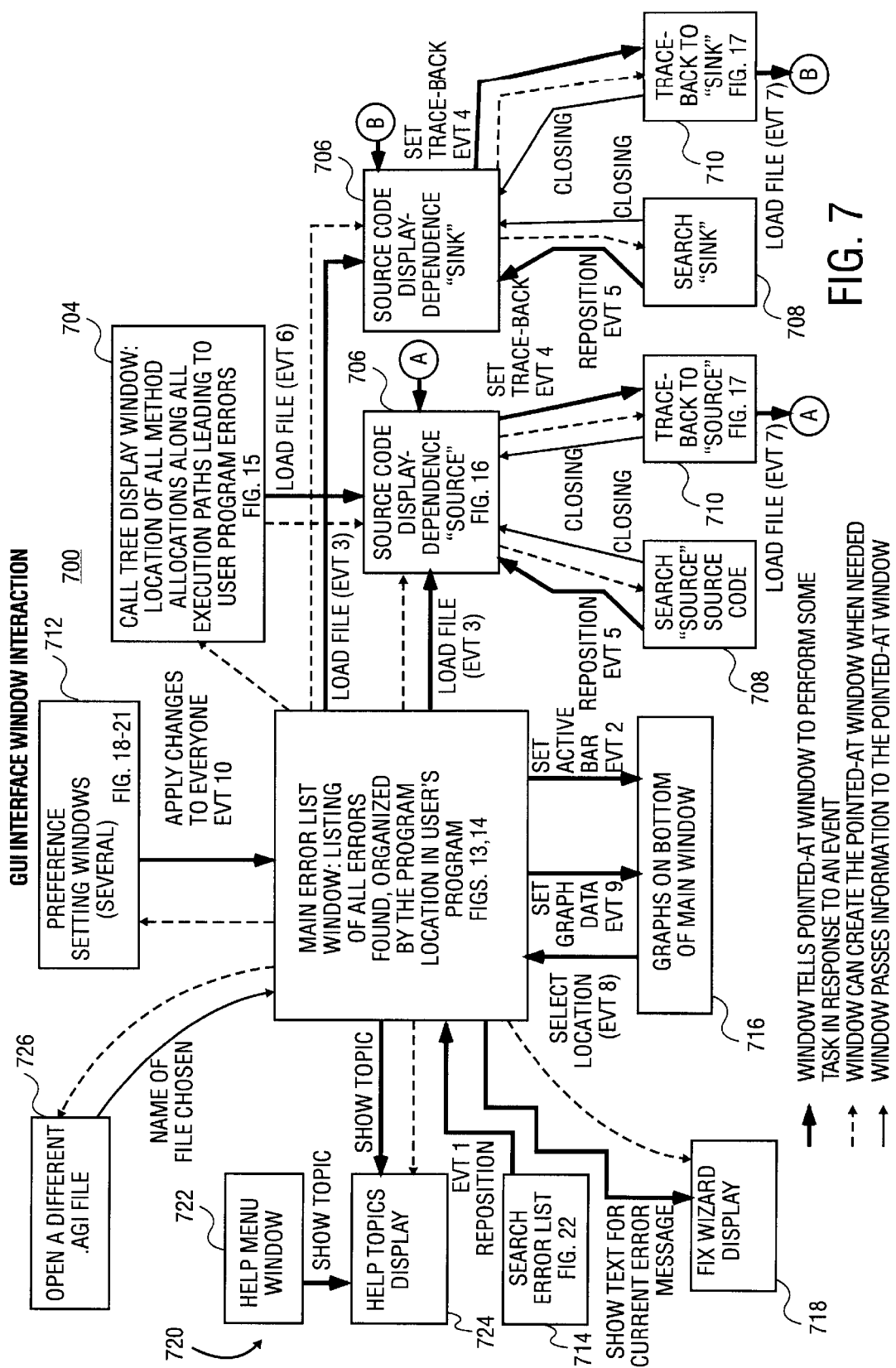
FIG. 7 is a diagram illustrating window interaction in a graphical user interface for use with the method of FIGS. 1–6.

FIG. 7 illustrates interaction of visual display windows which form a graphical user interface (GUI) 700 used for producing a report to a user. The report shows the places and kinds of defects detected during this execution of the program. In the illustrated embodiment, the graphical user interface 700 includes a plurality of windows. In the illustrated embodiment, these windows include a main error list window 702, a call tree display window 704, a source code display window 706 and preference setting windows 712.

Figure 13:
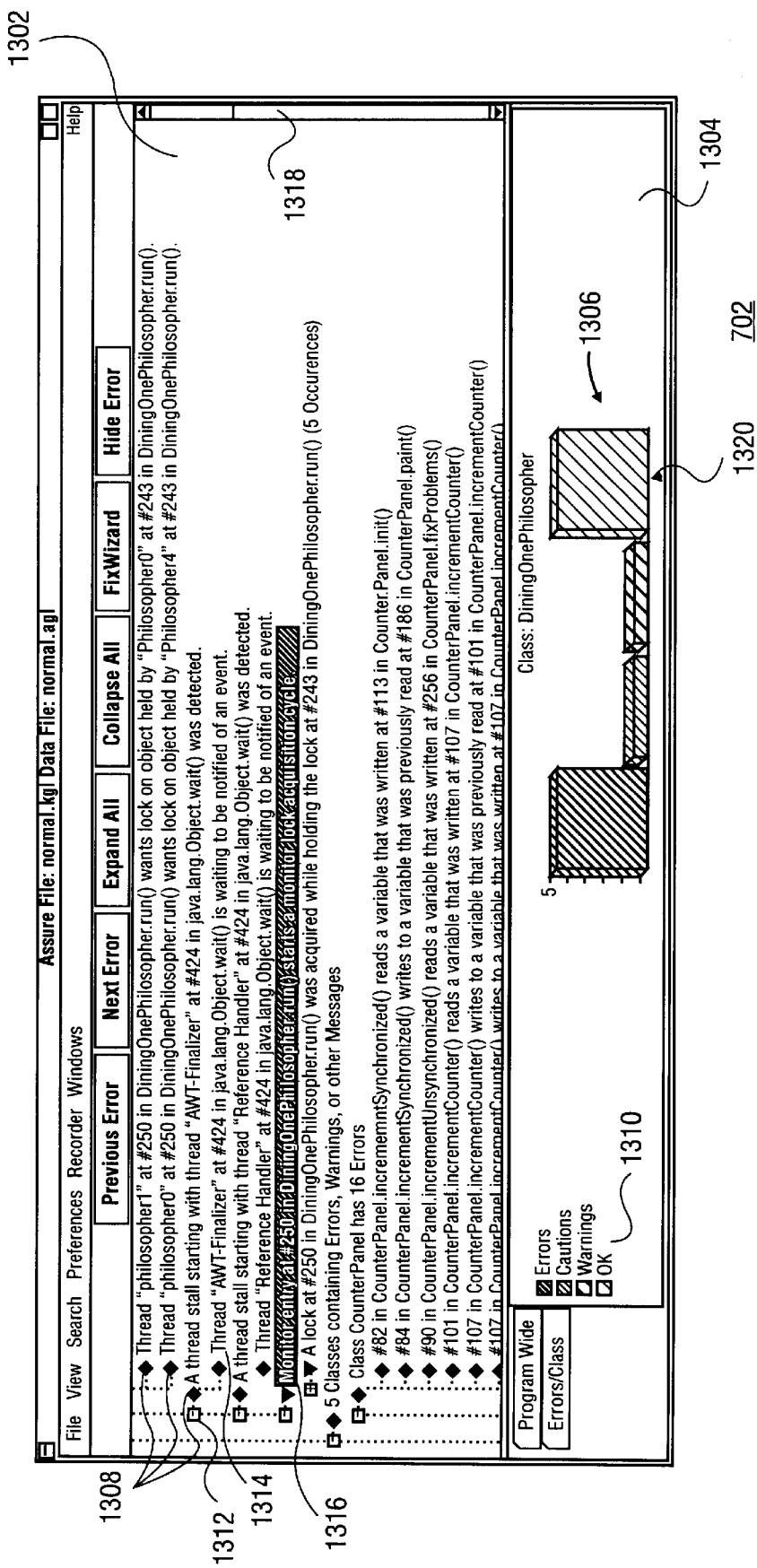
Figure 14:
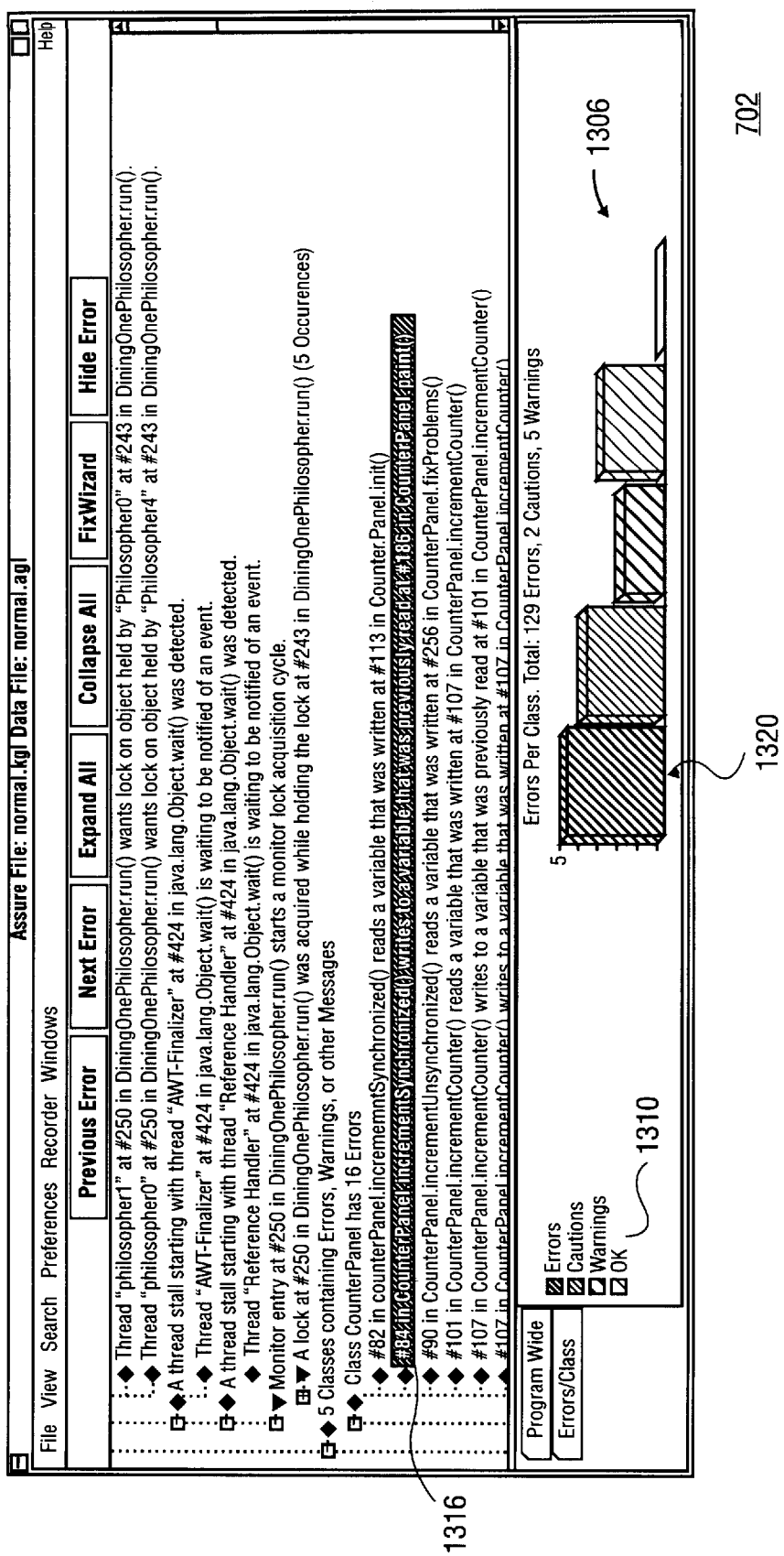

A main error list window 702 provides a listing of all errors found. Preferably, the errors are organized by the program location in the user's program. Examples of the main error list window 702 are illustrated in FIGS. 13 and 14. FIGS. 13 and 14 illustrate that the main error list window 702 uses a two frame window format. A first frame 1302 provides a textual list of error, caution and warning messages. A second frame 1304 displays a bar graph 1306 which provides a visual indication of the relative occurrence of errors, cautions, warnings and associated lines of code in the input user program. In the first frame 1302, a list of diagnostic messages 1308 is provided. Included with the text of the diagnostic message is a graphical symbol having a color or other graphical indication keyed to a color code 1310 displayed in the second frame 1304. Each diagnostic message 1308 has an associated detailed message 1314 which may be displayed by actuating a graphical element 1312 displayed with the diagnostic message 1308, for example by clicking on the graphical element 1312 using a mouse or tablet. Also in FIG. 13, the selected line 1316 is displayed in highlighted video, for example in reverse video or in a color which contrasts with background color in the frame. The selected line may be changed to select a different line by clicking another line with the mouse or via the keypad. The scroll bar 1318 or the arrow keys on the keypad can be used to move to different parts of the list of message 1308. The second frame 1304, as noted, includes a bar graph 1306. In response to selection of a line of text in the first frame 1302, an arrow 1320 is positioned beneath the bar in the bar graph which corresponds to the diagnostic condition of the selected line 1316. The arrow 1320, in conjunction with the bar graph 1306, provides additional graphical feedback to the user of error status of the multithreaded program processed by the method of the present invention.

Figure 15:
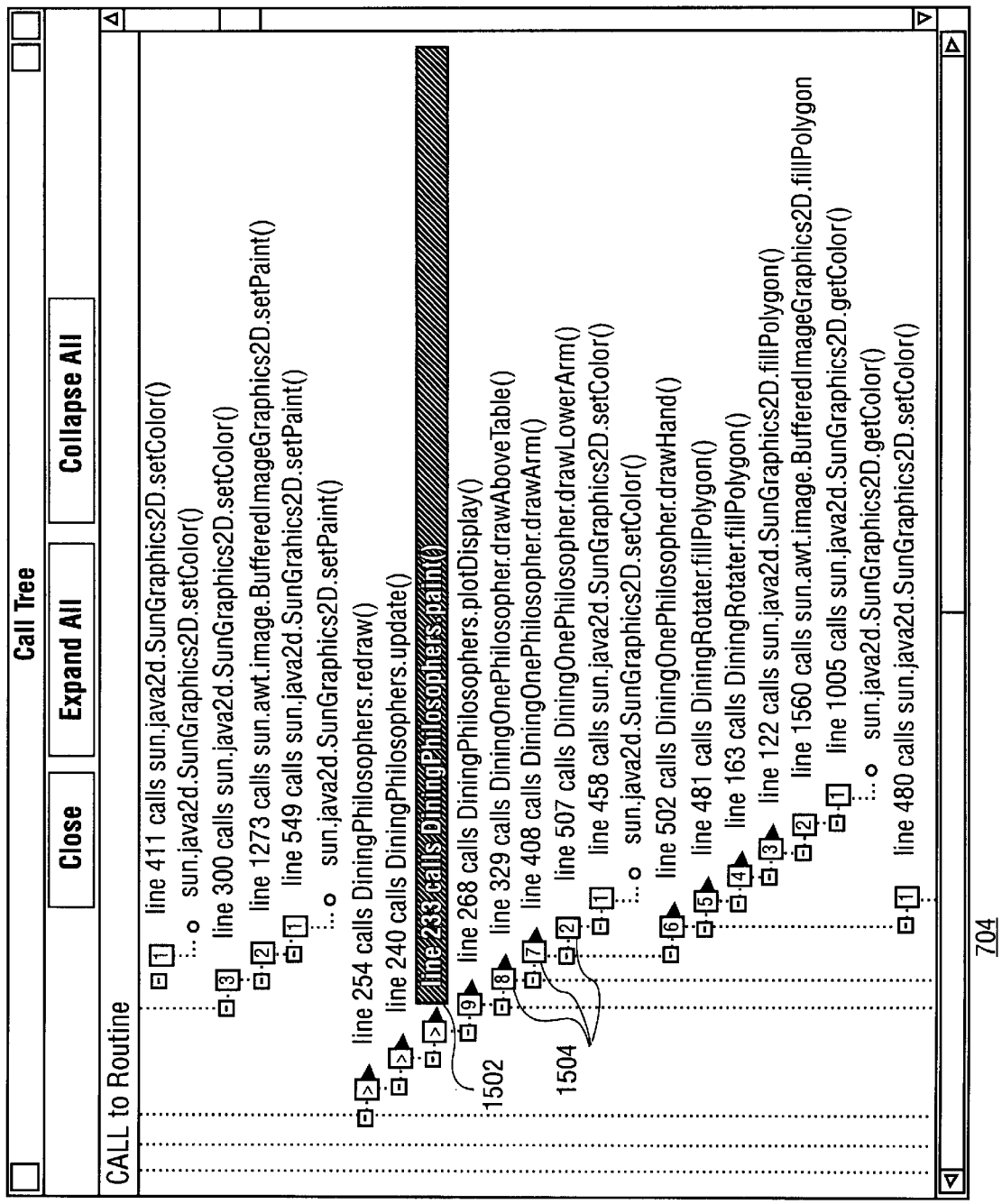

Referring again to FIG. 7, the graphical user interface 700 further includes a call tree display window 704. This window provides a graphical indication of the location of all method invocations (calls) along all execution paths leading to user program errors. An illustration of the call tree display window 704 is shown in FIG. 15. In FIG. 15, a selected line 1502 of text identifies the line of the user program which called a subroutine or other program portion, along with the program portion called. Adjacent to each line of text are boxes 1504 containing numbers which indicate the depth of the call tree stack below each point. These graphical elements along with the text provide for the user a clear trace of subroutine calls and program operation.

Figure 17:
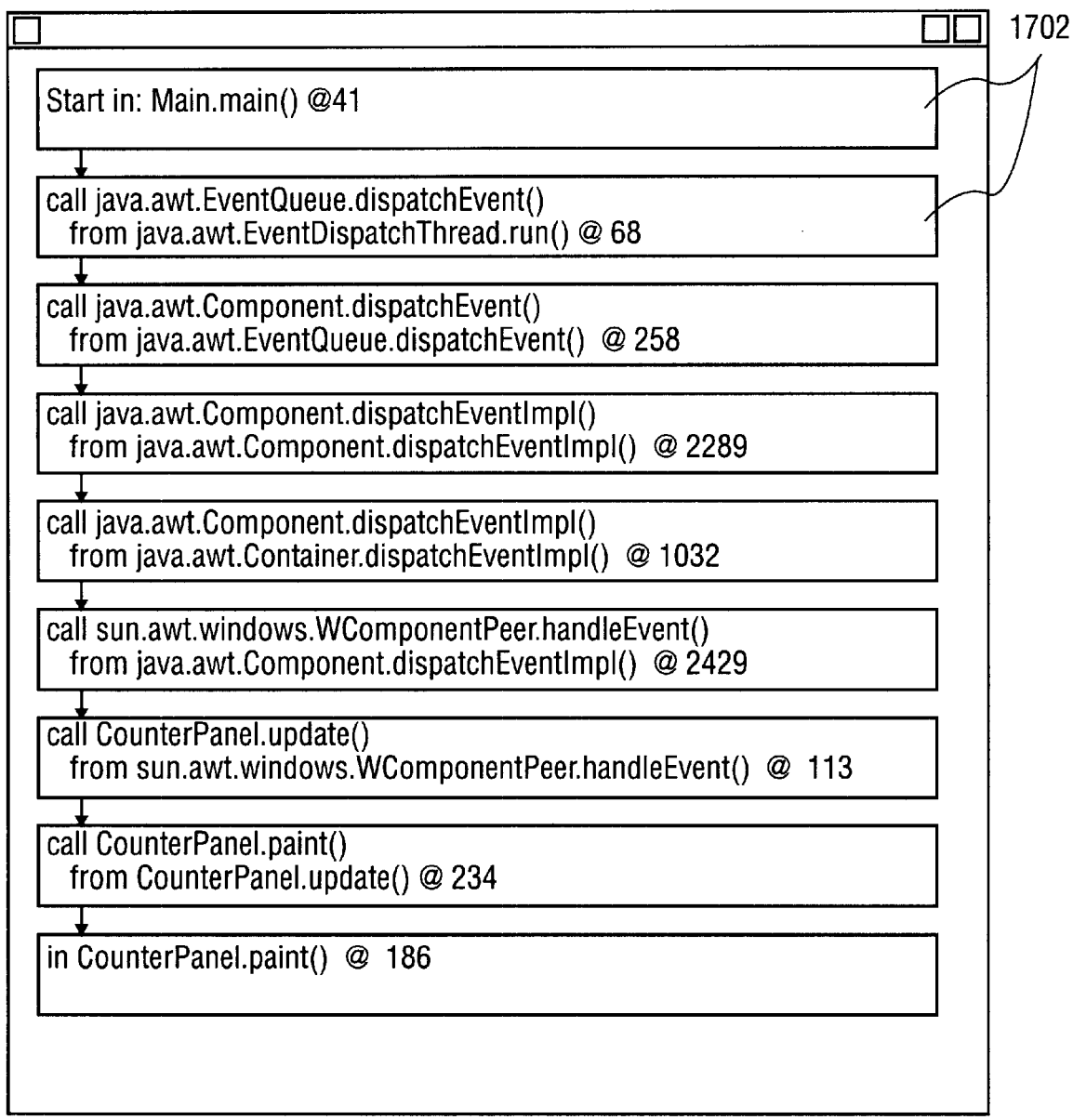

Referring again to FIG. 7, the graphical user interface 700 further includes a source code display window 706. One embodiment of the source code display window 706 is shown in FIG. 16. The source code display window shows in textual form the source code of the user's program. To facilitate identification of errors by a user, the source code display window 706 includes icons 1602 along the left side of the window 706 to mark error locations and severity. To provide an indication of severity, the icons and the text may be color coded, for example with icons and text corresponding to errors being displayed in red, icons and text corresponding to cautions being displayed in yellow, etc. The window 706 includes a search button 1604 and a traceback button 1606. By actuating these graphical buttons, a user may activate a search-source-code window 708 and a traceback window 710 (FIG. 7). An example of a traceback window 710 is shown in FIG. 17. In the traceback window 17, each box 1702 corresponds to a method invocation location or call site.

Figure 18:
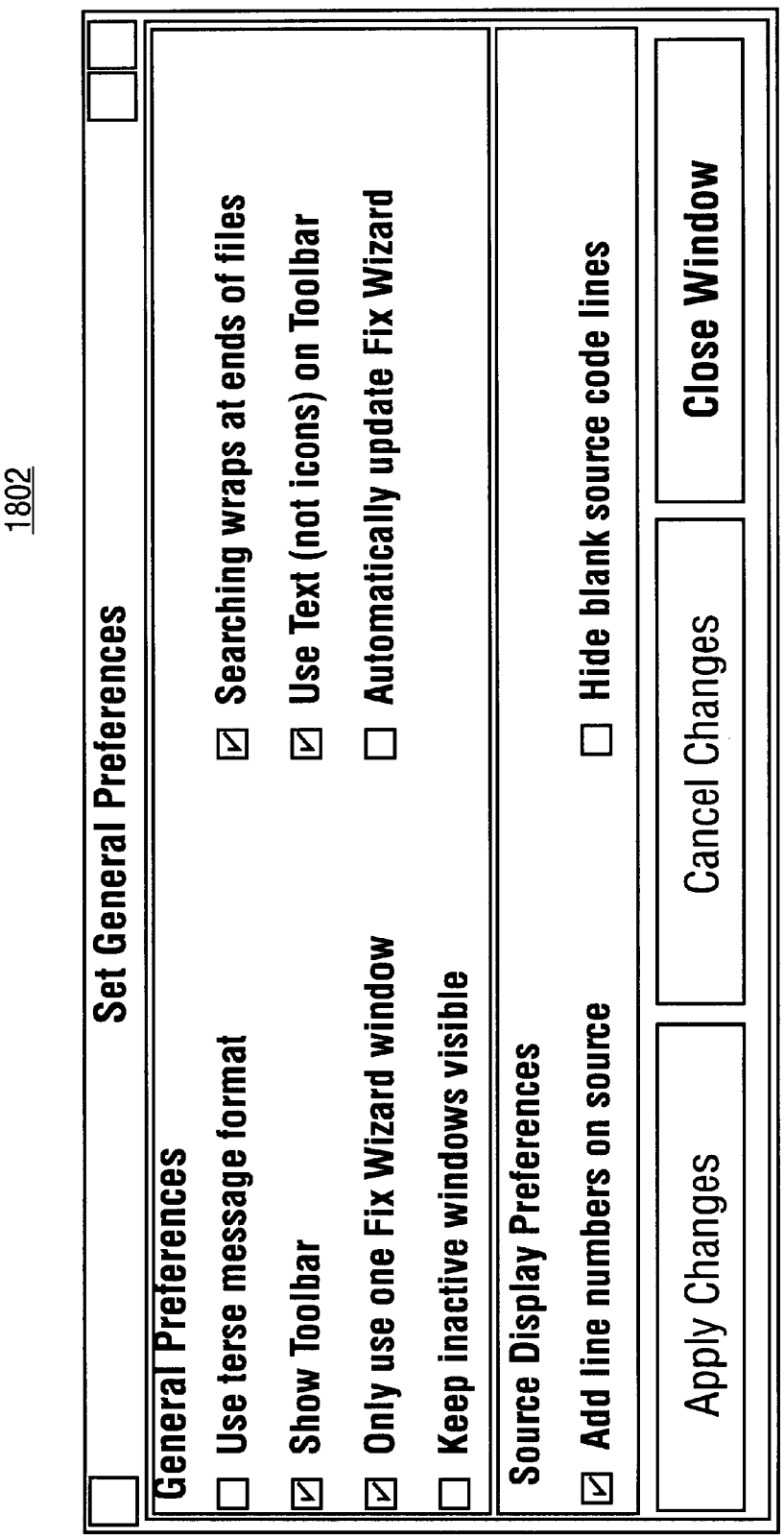

Referring again to FIG. 7, the graphical user interface 700 further includes preference setting windows 712. These windows are illustrated in FIGS. 18 through 21. FIG. 18 shows a window 1802 which may be used for setting general options and general user preferences. In response to selections made using the window 1802, the graphical user interface configures the various windows to display information requested by the user in the format selected by the user. FIG. 19 shows an error display window 1902 which may be used by a user to control the types of errors which are displayed or hidden on the various windows of a graphical user interface 700. As one example, during initial debugging and error detection, lower priority messages may be hidden so that the user may focus attention on higher priority messages. The user may then correct the errors which produce the higher priority messages and then move on to other types of errors. This allows the user to control the type of information being displayed so that the user can efficiently correct errors in the input program.

Figure 20:
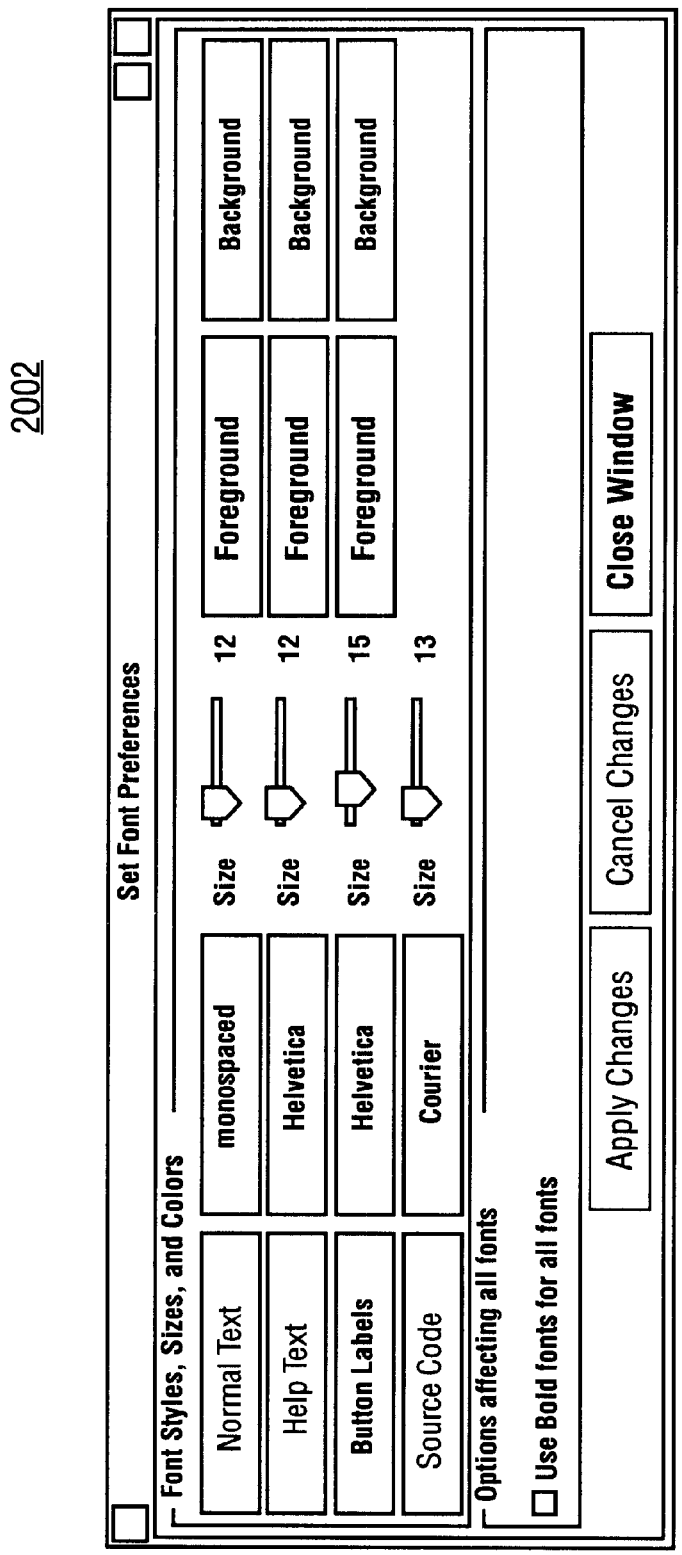
Figure 21:
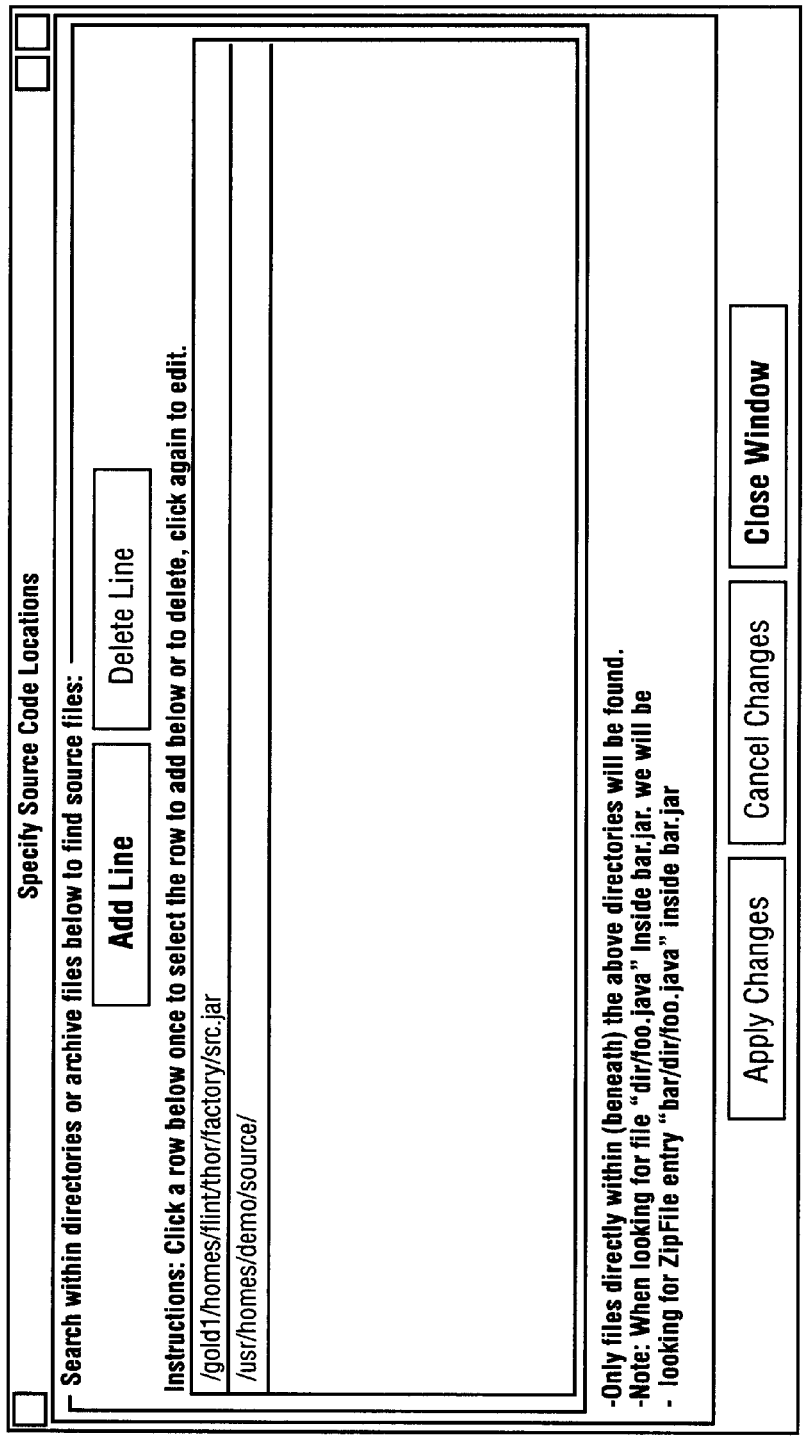

FIG. 20 illustrates a user preference window 2002 for controlling font styles, sizes and colors. Allowing the user to customize these items using the user preference window increases convenience for the user and improves efficiency and productivity when debugging programs. Lastly, in FIG. 21 a source code location preference window 2102 allows the user to specify the location in computer memory of the source code of the user program.

Figure 22:
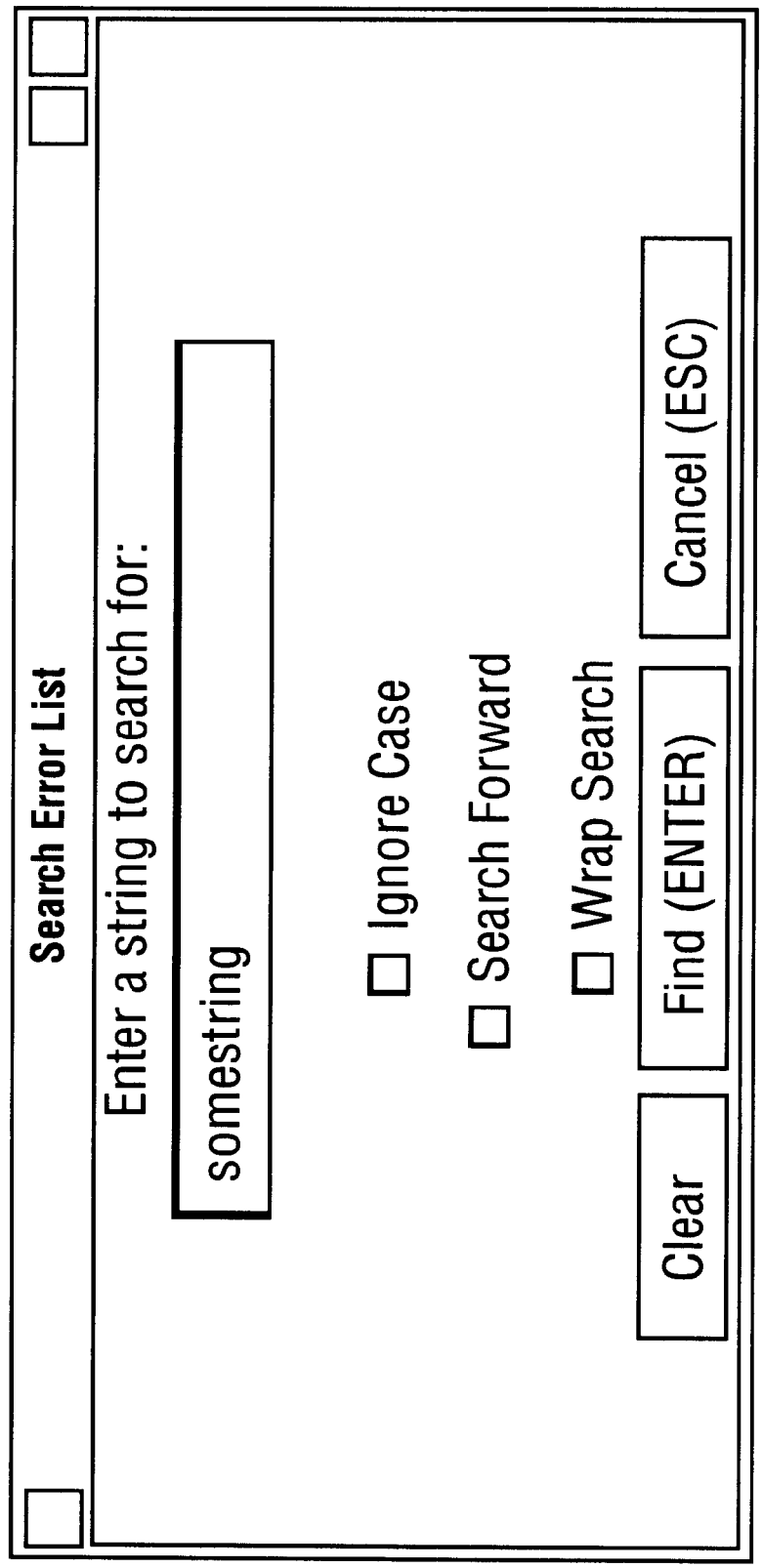

Referring again to FIG. 7, the graphical user interface 700 further includes a search error list window 714. One embodiment of the search error list window 714 is shown in FIG. 22. The search error list window 714 allows a user to specify a text string to be located in the error list. This allows the user to focus attention on particular types of errors or errors involving particular routines.

To complete the identification of elements of the graphical user interface 700, the interface 700 further includes a window 716 for displaying the bar graphs contained in the second frame 1304 of the main error list window 702. The interface 700 further includes a fix wizard display window 718 for operating in response to user input to correct errors in the user's input program. The interface 700 still further includes help windows 720, including a help menu window 722 and a help topics display window 724. Finally, the graphical user interface 700 includes a file opening window 726 for allowing a user to specify a different file to open.

FIG. 7 includes graphical indications of how the windows forming the graphical user interface 700 interact. In the convention of FIG. 7, a double line arrow indicates that an originating window tells the pointed-at window to perform some task in response to an event. A dashed line arrow indicates that the originating window can create the pointed-at window when needed. Finally, a single line arrow indicates that the originating window passes information to the pointed-at window. Not all possible window interactions are shown in FIG. 7. For simplicity in the figure, several arrows have been omitted. For example, the main error list window 702 includes a double line arrow to all other windows for a task in the nature of commanding the pointed-at windows to update their displays using changed user preferences. As another example, all windows have a single line arrow back to the main error list window 702 for indicating that the originating window is closing.

Figure 8:
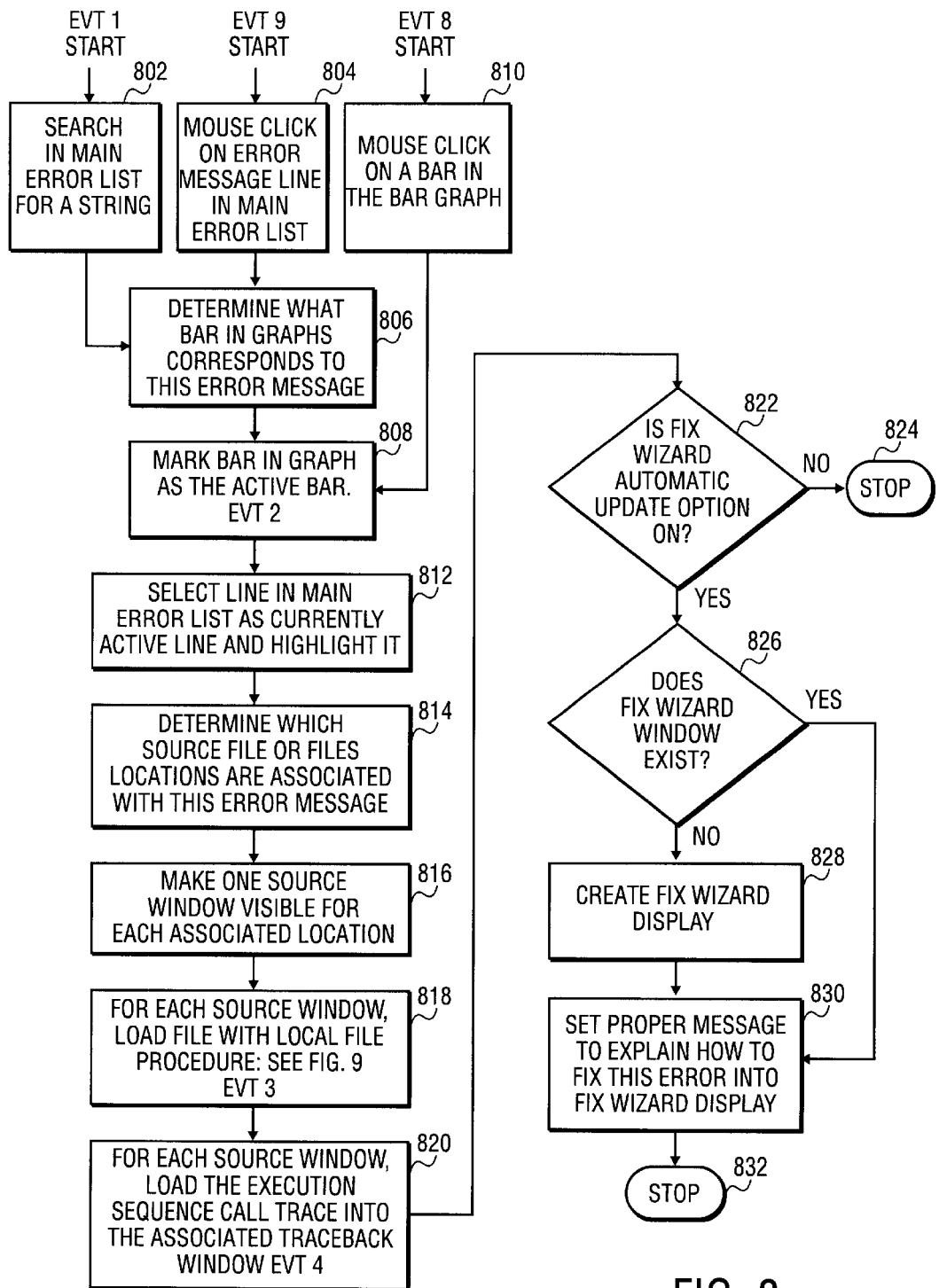
FIG. 8 through FIG. 11 are flow diagrams illustrating operation of the graphical user interface.

FIG. 8 is a flow diagram illustrating operation of the graphical user interface 700 of FIG. 7. The graphical user interface 700 is event driven, meaning that all actions taken after initialization are in response to user input events. In the flow diagrams of FIG. 8, FIG. 9, FIG. 10 and FIG. 11, main user input events are shown in boxes having rounded corners and actions performed by the graphical user interface in response to user input events are shown in boxes having sharp corners. User input events illustrated in FIG. 8 are keyed to the user interface 700 of FIG. 7.

A first user input event is step 802, corresponding to Evt1. In step 802, the user enters a string for searching in the main error list. The user uses, for example, the search error list window 714, illustrated in FIG. 22. A second user input event is step 802, in which a user actuates an error message line in the main error list window 702. The actuation may be in the form of a mouse click. This corresponds to Evt9 and is illustrated in FIGS. 13 and 14.

After either step 802 or step 804, control proceeds to step 806 during which the graphical user interface 700 determines which bar in the bar graph illustrated at the bottom of the main error list window 702 corresponds to this error. At step 802, the identified bar in the bar graph is marked as the active bar. For example, this corresponds to moving the arrow 1320 (FIGS. 13 and 14) to the designated bar. This corresponds to Evt2 in FIG. 7. Also, a third initiating event by a user is illustrated as step 810. In step 810, corresponding to Evt9 in FIG. 7, a user enters a mouse click in the bar graph illustrated in FIGS. 13 and 14. In response to this user input of step 810, at step 808, the selected bar is marked as the active bar.

Figure 9:
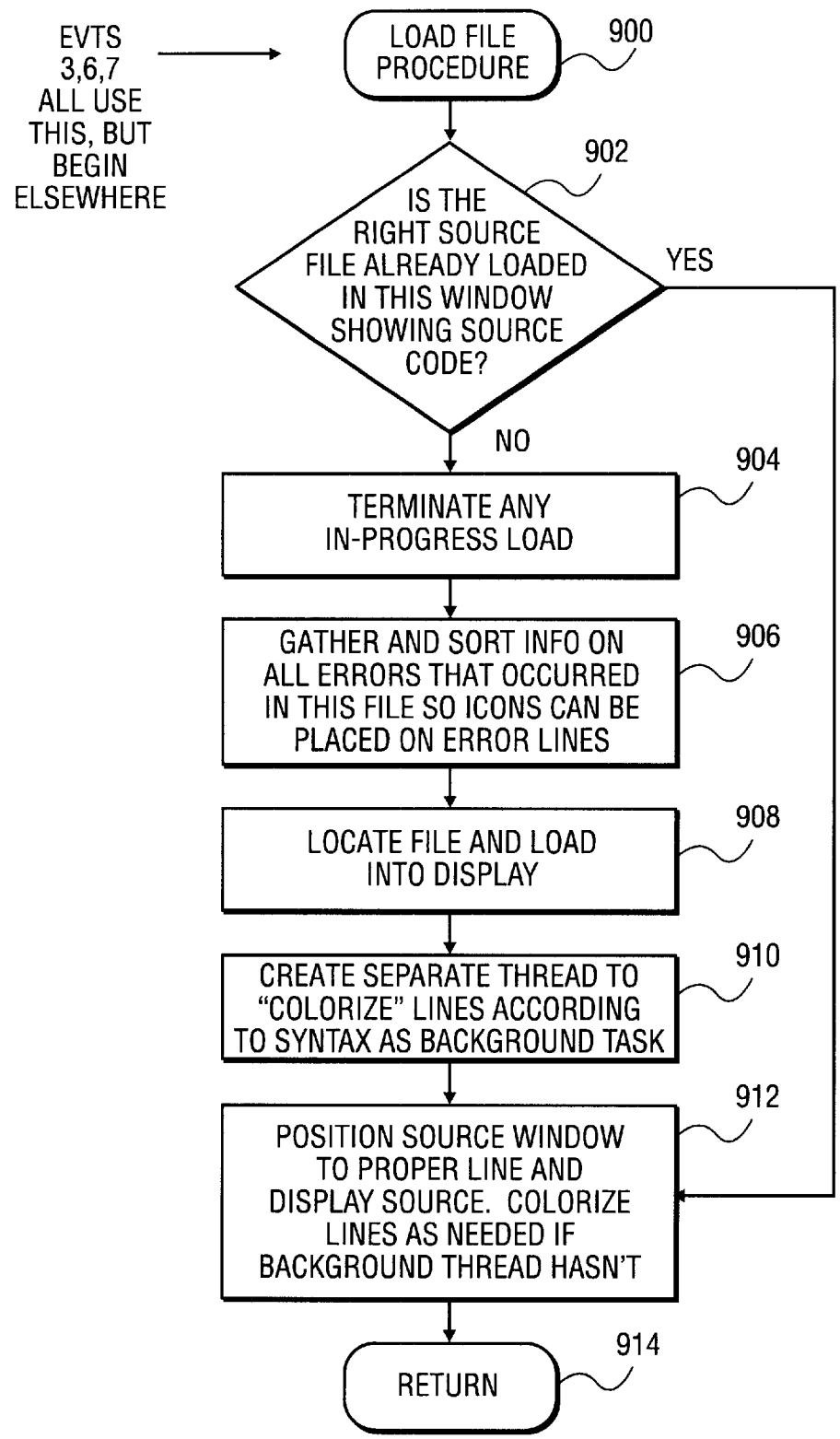

Step 812 follows step 808. In step 812, the currently active line in the main error list window 702 (FIG. 7) is selected and is highlighted in the display of FIGS. 13 and 14. At step 814, the graphical user interface 700 determines which source file or files are associated with the selected error message. At step 816, the interface 700 makes one source window visible for each associated location determined in step 814. At step 818, for each source window, a load file procedure is executed. This load file procedure is illustrated in FIG. 9. At step 820, for each source window, the execution sequence call trace is loaded into the associated trace back window. This corresponds to Evt4 (FIG. 7).

At step 822, it is determined if the fix wizard automatic update option is turned on. This corresponds to a user selectable preference. If this option is not turned on, execution stops at step 824. If this option is turned on, at step 826, it is determined if the fix wizard window exists. If not, at step 828, the fix wizard display window 718 is created and then at step 830, a suitable message to explain how to fix the selected error is displayed in the fix wizard display window 718. Execution ends at step 832.

FIG. 9 illustrates a load file procedure used by several different portions of the graphical user interface 700 of FIG. 7. For example, the method steps illustrated in FIG. 9 correspond to step 818 of FIG. 8. The method begins at step 900.

At step 902, it is determined if the right source file is already loaded in this window showing the source code. If so, execution proceeds to step 912. If not, at step 904, any in-progress file loading procedure is terminated and at step 906, the graphical user interface gathers and sorts information on all errors that have occurred in this file so that suitable icons can be placed on error lines in the display window. At step 908, the file to be loaded is located and loaded into the display. At step 910 a separate thread is created to color code the lines of the loaded file on the display. At step 912, the source window is positioned at the proper line and the source code is displayed. If color coding has not been provided in the display, this is updated at step 912. The method of FIG. 9 terminates at step 914 and control returns to the routine which called the load file procedure.

Figure 10:
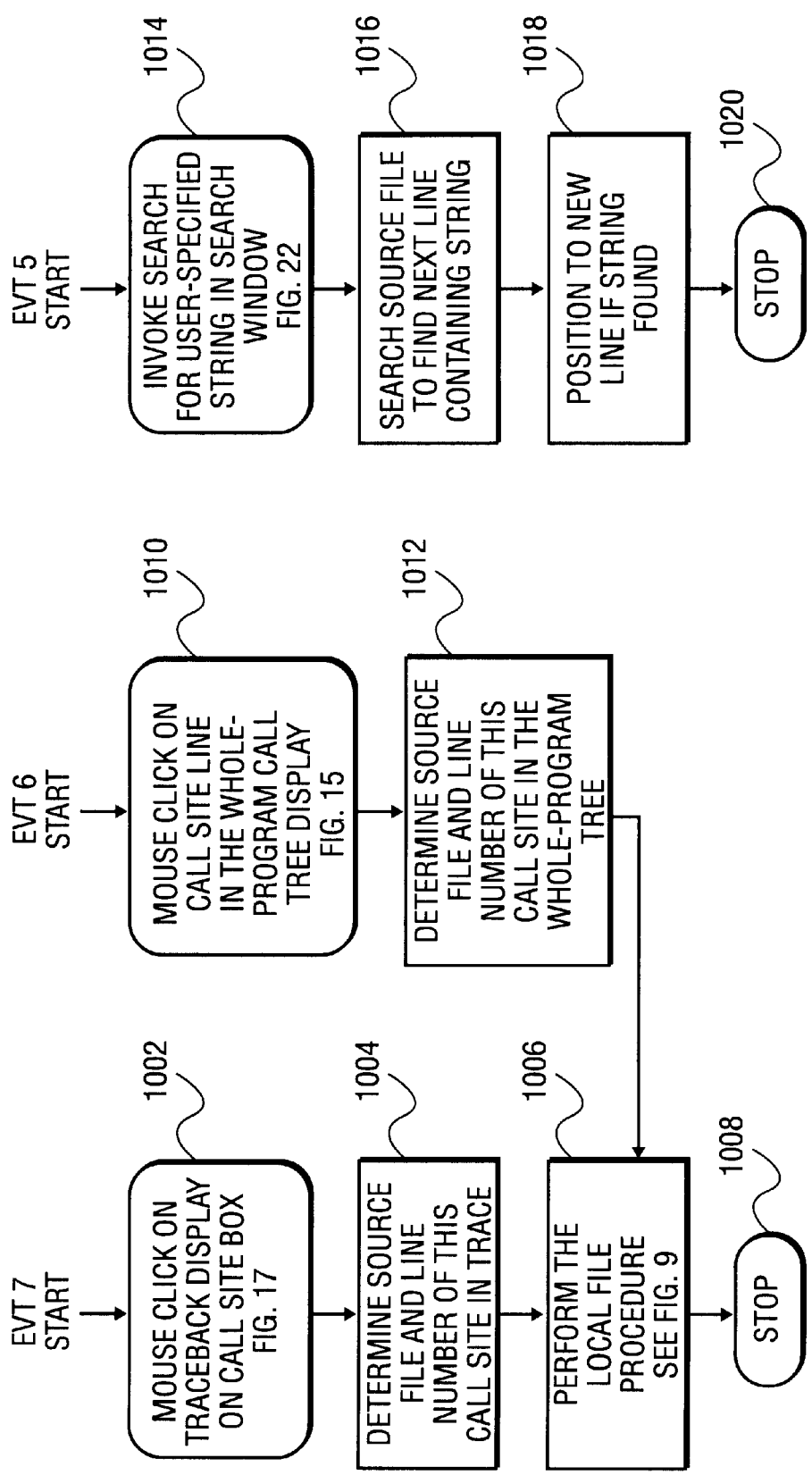

In FIG. 10, further user input events and resulting graphical user input responses are illustrated. A first user input corresponds to Evt7 (FIG. 7). At step 1002, the user performs a mouse click on the traceback display 710, selecting a particular call site box. For example, this is illustrated in FIG. 17. In response to step 1002, the graphical user interface 700 determines the source file and line number corresponding to the selected call site in the trace. At step 1006, the graphical user interface 700 performs the load file procedure illustrated in FIG. 9. Execution ends at step 1008.

Another user input event is illustrated as step 1010, corresponding to a user's mouse click on a call site line in the call tree display window 704. This is illustrated in FIG. 15. In response to the user input, at step 1012, the graphical user interface determines the source file and line number of this call site in the whole program tree. Using this source file and line number, at step 1006, the user interface performs the load file procedure of FIG. 9.

Another user input event occurs at step 1014, corresponding to Evt5. At step 1014, the user initiates a search for a user specified search string in the search window, illustrated in FIG. 22. In response to this user input, at step 1016, the graphical user interface searches the source file to find the next line containing the string. If the string is found, the graphical user interface 700 then positions the display to the line of the located string. Processing terminates at step 1012.

Figure 11:
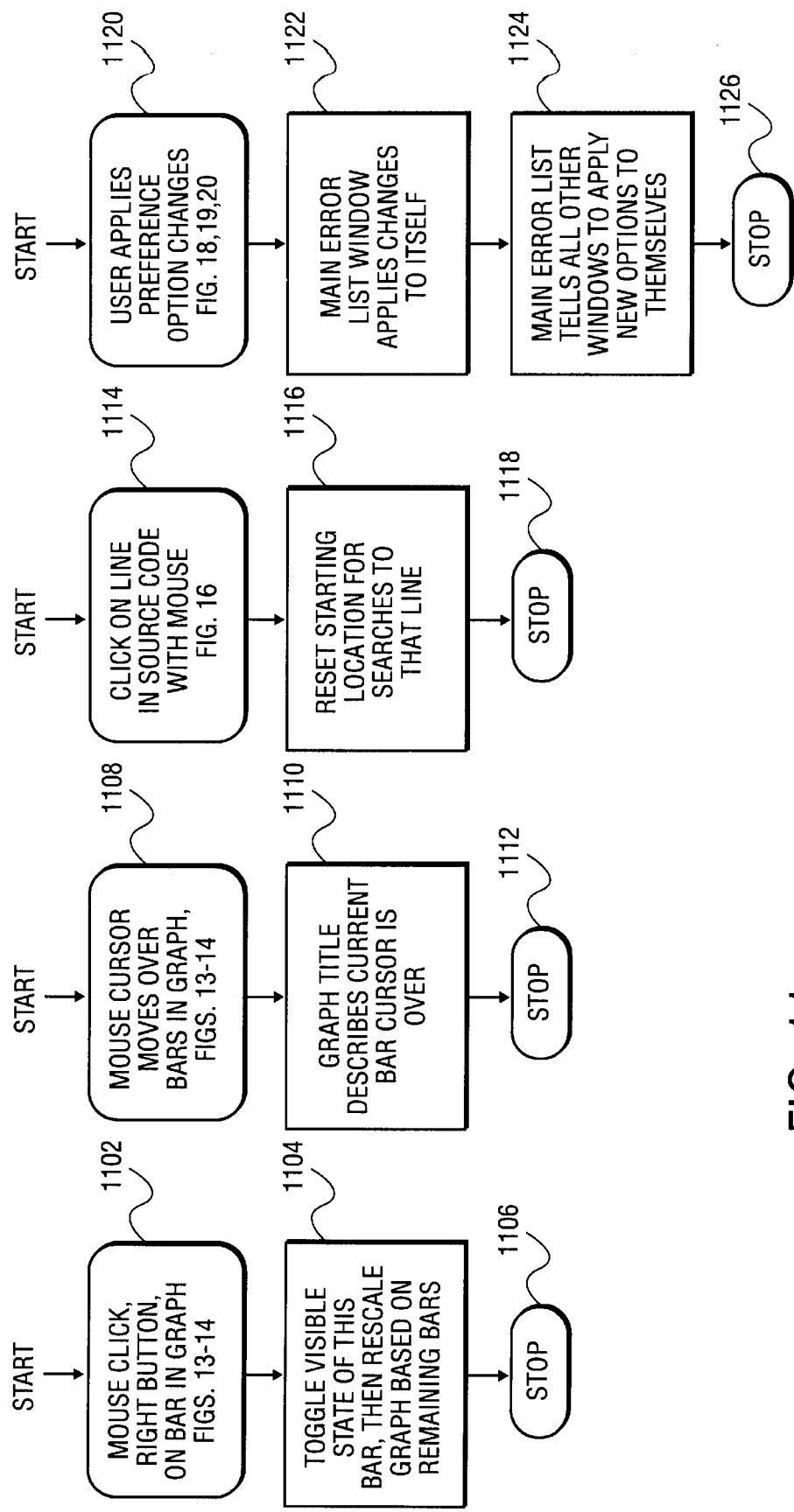

FIG. 11 illustrates further user input events and corresponding responses from the graphical user interface. One user input event is step 1102, in which a user enters an input via a mouse click, using the right button of a mouse, on a bar in the bar graph illustrated in FIGS. 13 and 14. At step 1104, in response to this user input, the graphical user interface 700 toggles the visible state of this bar then rescales the bar graph based on the remaining bars to fit the display area. Processing in response to this user input terminates at step 1106.

Another user input occurs at step 1108 when the user moves the mouse cursor over bars in the bar graph illustrated in FIGS. 13 and 14. In response to this user input, at step 1110, the illustrated title for the graph is changed to describe the content of the current bar over which the cursor is presently located. Processing ends at step 1112.

A further user input event is illustrated as step 1114. In step 1114, the user clicks the mouse on a line in the source code display window 706. This is shown in FIG. 16. In response to this user input, at step 1116, the graphical user interface 700 resets the starting location for searches to the line designated by the user's input click. Processing terminates at step 1118. Another example of a user input event is shown at step 1120. At step 1120, the user selects user preferences from among those illustrated in FIGS. 18, 19 and 20. In response to the user's input selection, the main error list window 702 applies the selected options to itself then, in step 1124 the main error list window 702 tells all other windows to apply the new user preference options to themselves. Processing terminates at step 1126.

Figure 12:
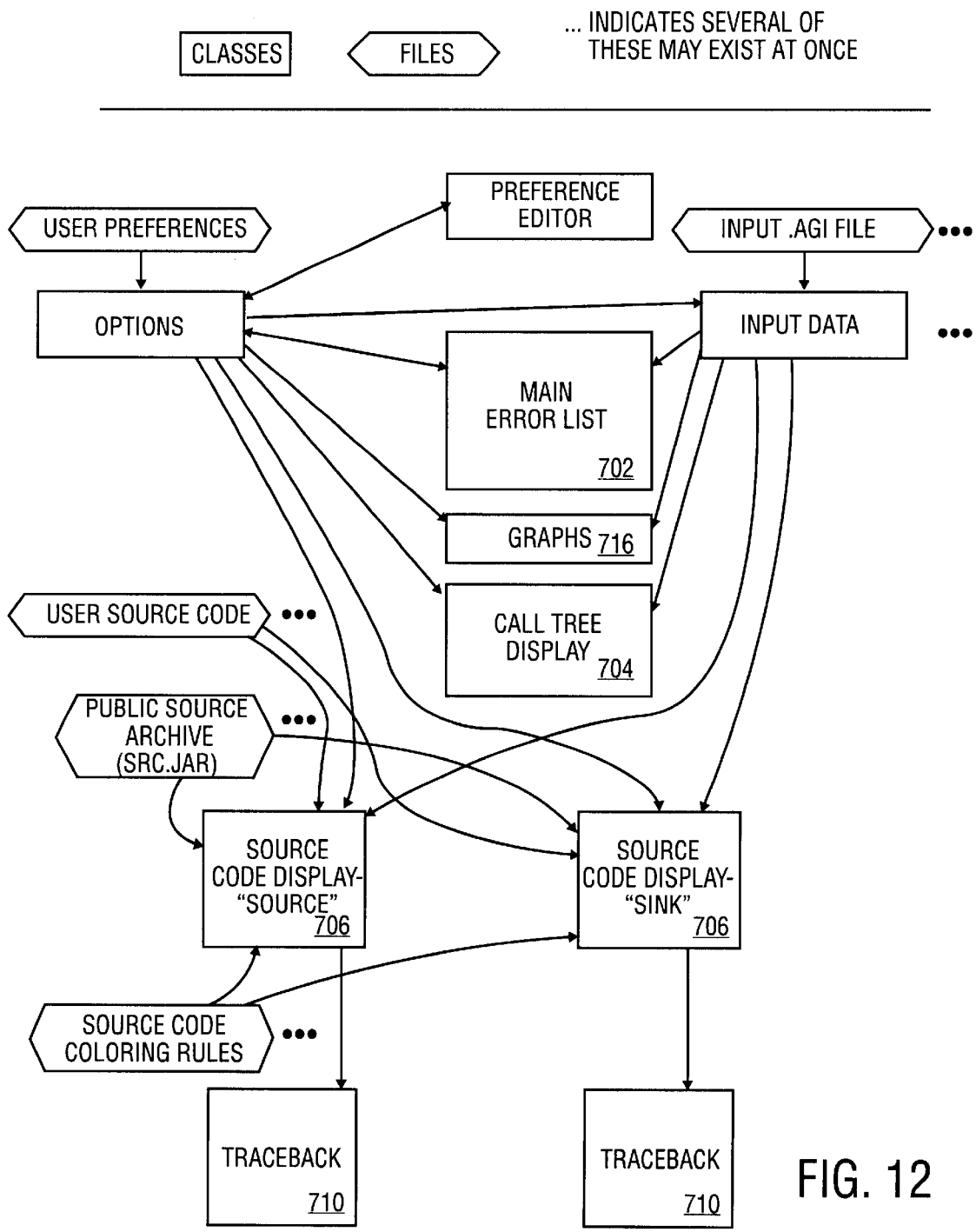
FIG. 12 illustrates data flows in the graphical user interface.

FIG. 12 illustrates data flows among components of the graphical user interface 700. In FIG. 12, objects illustrated in rectangular boxes correspond to classes of data, objects illustrated as nonrectangular boxes correspond to data files. Ellipses (. . .) indicate that several of the illustrated items may exist at the same time.

The method in accordance with the present invention has several improvements and distinctions over the prior art. First, the method is based on a happens-before relationship which allows it to calculate derived synchronization conditions, and also to support ordered synchronization. This is an improvement on Eraser, and similar to RecPlay. Second, the method only requires a single execution of the program to determine the existence of threading errors, and to collect the information necessary to display these errors to the user. This is similar to the operation of Eraser, and an improvement over the operation of RecPlay which requires multiple identical executions of the program being analyzed. Finally, the method is also designed to catch errors other than data-races. It can detect the existence of a monitor lock cycle (which implied a potential deadlock), and can report on the existence of a deadlock it if occurs during the execution.

The reporting tool in accordance with the present invention is a component that displays the information (data-races and deadlock conditions) as a list of ordered pairs. The pairs describe the previous and current accesses to the variables for the data-races, and the current and next locks being held for the deadlock conditions. A graphical overview, in the form of a bar chart, is also provided to assist in the navigation of the reported messages. The messages are prioritized into the categories of "informational", "warning", "caution", and "error". Each category is visually indicated by a colored icon. The color sequence from minor to severe is "green", "yellow", "orange", and "red". Each icon also uses a different shape.

While a particular embodiment of the present invention has been shown and described, modifications may be made. For example, the method in accordance with the present invention may be implemented using computer executable software code, hardwired logic, or any suitable combination of them. Further, any suitable graphical user interface may be implemented for display and correction of threading errors. A Windows interface is one optional embodiment. It is therefore intended in the appended claims to cover all such changes and modifications which fall within the true spirit and scope of the invention.

What is claimed is:

1. A method for detecting threading defects in a multithreaded program, the method comprising:

generating an annotated memory address trace from the multithreaded program, wherein said generating comprises inserting an opcode within said multithreaded program, which when executed causes a procedure to analyze said annotated memory address trace, said opcode depending upon a type of said node;

analyzing the annotated address trace to detect defects; and displaying results of analysis using a graphical user interface.

2. The method of claim 1 wherein analyzing the annotated address trace comprises detecting race conditions and providing an indication when a race defect occurs.

3. The method of claim 2 further comprising the steps of:

identifying locks among multiple threads of the multithreaded program;

detecting when two or more threads of the multithreaded program access the same lock;

determining a partial ordering of the two or more threads; and when a subsequent access of the same lock occurs, determining if a previous access and current access are totally ordered;

if the accesses are not totally ordered, providing the indication that a race defect has occurred.

4. The method of claim 1 wherein analyzing the annotated address trace comprises detecting a deadlock and providing an indication when a deadlock defect occurs.

5. The method of claim 4 wherein detecting a deadlock comprises detecting at least one of a stall condition, a monitor lock cycle condition and a deadlock condition.

6. The method of claim 5 further comprising the steps of:

monitoring a time period during which a thread waits for a lock; and when the time period exceeds a predetermined threshold, determining that a stall condition has occurred.

7. The method of claim 5 further comprising the steps of:

forming a lock acquisition graph in response to a thread acquiring a lock; and if the lock acquisition graph becomes cyclic, determining that a monitor lock cycle condition has occurred.

8. The method of claim 5 further comprising the steps of:

forming a deadlock cycle graph in response to a thread acquiring a lock; and if the deadlock cycle graph becomes cyclic, determining that deadlock condition has occurred.

9. A machine-readable medium having stored thereon a set of instructions, which if executed by a machine, cause the machine to perform a method comprising:

generating an annotated memory address trace, wherein said generating comprises inserting an opcode into a node within said multithreaded program, which when executed causes a procedure to analyze said annotated memory address trace, said opcode depending upon a type of said node;

analyzing the annotated memory address trace to detect defects in the annotated memory address trace; and interactively operating a graphical user interface for displaying and resolving the defects in the annotated memory address trace.

10. The machine readable medium of claim 9 wherein analyzing the annotated address trace comprises detecting race conditions and providing an indication when a race defect occurs.

11. The machine readable medium of claim 10 further comprising the steps of:

identifying locks among multiple threads of the multithreaded program;

detecting when two or more threads of the multithreaded program access the same lock;

determining a partial ordering of the two or more threads; and when a subsequent access of the same lock occurs, determining if a previous access and current access are totally ordered;

if the accesses are not totally ordered, providing the indication that a race defect has occurred.

12. The machine readable medium of claim 10 wherein analyzing the annotated address trace comprises detecting a deadlock and providing an indication when a deadlock defect occurs.

13. The machine readable medium of claim 12 wherein detecting a deadlock comprises detecting at least one of a stall condition, a monitor lock cycle condition and a deadlock condition.

14. The machine readable medium of claim 13 further comprising the steps of:

monitoring a time period during which a thread waits for a lock; and when the time period exceeds a predetermined threshold, determining that a stall condition has occurred.

15. The machine readable medium of claim 13 further comprising the steps of:

forming a lock acquisition graph in response to a thread acquiring a lock; and if the lock acquisition graph becomes cyclic, determining that a monitor lock cycle condition has occurred.

16. The machine readable medium of claim 13 further comprising the steps of:

forming a deadlock cycle graph in response to a thread acquiring a lock; and if the deadlock cycle graph becomes cyclic, determining that deadlock condition has occurred.

* * * * *